US008855455B2

(12) United States Patent
Keller et al.

(10) Patent No.: US 8,855,455 B2
(45) Date of Patent: Oct. 7, 2014

(54) FIBER OPTIC CABLE

(75) Inventors: David Keller, Cary, NC (US);
Christopher Raynor, Holly Springs, NC (US); Terry Gooch, Holly Springs, NC (US); Randie Yoder, Garner, NC (US); Dan Rouse, Apex, NC (US); Andrew Punch, Holly Springs, NC (US)

(73) Assignee: Nexans, Paris (FR)

( * ) Notice: Subject to any disclaimer, the term of this patent is extended or adjusted under 35 U.S.C. 154(b) by 273 days.

(21) Appl. No.: 13/303,350

(22) Filed: Nov. 23, 2011

(65) Prior Publication Data
US 2013/0129290 A1 May 23, 2013

(51) Int. Cl.
*G02B 6/44* (2006.01)
(52) U.S. Cl.
USPC .......................................... 385/110; 385/112

(58) Field of Classification Search
None
See application file for complete search history.

(56) References Cited

U.S. PATENT DOCUMENTS

| 6,253,012 B1 * | 6/2001 | Keller et al. .................. 385/109 |
| 2006/0088263 A1 * | 4/2006 | Tanaka et al. ................. 385/128 |

* cited by examiner

*Primary Examiner* — Jerry Rahll
(74) *Attorney, Agent, or Firm* — Sofer & Haroun, LLP

(57) ABSTRACT

An arrangement provides for an optical fiber cable having a plurality of fiber optic elements including a glass portion and a UV optical coating portion. A plurality of buffer tubes each contain one or more of the plurality of optical fibers made of a fire retardant polymer. A jacket surrounds the buffer tubes also made of a fire retardant polymer. The fire retardant polymers for the plurality of buffer tubes and for the jacket are selected from PVDF (PolyVinyliDene Fluoride) or FRPVC (Fire Resistance Poly Vinyl Chloride). The ratio of total polymer to UV optical coating of the fiber optic elements, by area, is substantially in the range of 5:1 to 9:1.

14 Claims, 33 Drawing Sheets

FIBER OPTIC CABLE

BACKGROUND

1. Field of the Invention

This application relates to communication cables. More particularly, this application relates to loose-tube type fiber optic cables.

2. Description of the Related Art

In the area of fiber optic cables, there are many different designs, each of which has some purpose both in fiber count, mechanical properties, environmental resistance properties, fire resistance/smoke, etc. . . . Among the various designs, mid count-designs (i.e. more than 12—less than 200 fibers) typically contain the fibers in a loose tube style arrangement. "Loose tube" is a commonly understood term designating a fiber cable design that has a jacket, at least one buffer tube inside the jacket with at least one (usually more) UV coated optical fiber(s) loosely contained inside each buffer tube.

More particularly, the "loose" term in "loose tube" refers to the fibers being loose within buffer tube thus allowing the fibers to reside within a relatively free space. Within this free space the fibers have the ability to bend/move (such as into a sinusoidal shape or minimally helical shape) along the length of the cable, accumulating as the cable (jacket and tubes) contracts over cold temperature extremes. By allowing for this "loose" room within the buffer tubes, the fibers are able to avoid the stresses imparted by the cold temperatures on the tubes and jacket and thus likewise avoid undue attenuation.

For example, within the area of loose tube type optical fiber cables, the designation "LT" is a standard for a tube approximately 3 mm in outside diameter (herein after "OD") and 2 mm inside diameter (hereinafter "ID") with a corresponding 0.5 mm wall thickness. Some variations on these dimensions are also available in the prior art. The interior fibers have ample free space to move.

On the other hand, a different type of fiber optic cable is the so-called Tight Buffer or "TB" type cable were where the optical fiber is tightly encapsulated with plastic. These encapsulated fibers are subsequently grouped in subunits.

Focusing on loose tube type arrangements, FIGS. 1 and 2 show some basic prior art designs for mid-count loose tube type fiber optic cables FIG. 1 shows a first prior art loose tube fiber optic cable for one hundred and forty four (144) fibers bundled into twelve independent buffer tubes, twelve fibers each, arranged around a strength member. FIG. 2 shows a separate prior art arrangement for a loose tube fiber optic cable for one hundred and forty four (144) fibers bundled into thirty six independent buffer tubes, four fibers each, divided into three twelve tube subunits inside the larger outer jacket.

Some prior art designs such as those shown in FIG. 2, akin to the loose tube LT design, employ smaller and thinner buffer tubes to protect the fibers. For example, in some cases, the buffer tubes may have very thin walls and have very low interior space and can be referred to as thin wall low interior space tubes (or "TWLIS") or "TL" for short (T=Thin Walled and L=Low Interior Space). Such TL tubes, apart from protecting the fibers when the jacket is removed (e.g. for connectorization), are also used to help bundle and identify the various fibers within (e.g. by color grouping).

However, even though such prior art designs are adequate for basic protections of the fibers and organization purposes they have problems particularly when trying to address the mechanical and smoke/fire properties of buffer tubes and jackets within such TL type loose tube cables.

There has been many variations of TL tubes in the market but they tend to be unreliable when four (4), six (6) and twelve (12) fibers are enclosed within.

For example, one prior art type cable provides an equation where the desirable Young's modulus for the buffer tube material should be:

$Y = 590 \times (\text{tube wall thickness})^{-1.2}$ (wall thickness is in mm)
(material modulus is in PSI)

Using the examples in the prior art with a nominal range of buffer tube wall thickness between 0.2 and 0.3 mm (est. 0.25 mm) the equation shows the calculated ideal modulus to be $$590 * (0.25)^{-1.2} = 3114 \text{ psi}$$

This is relatively close to the prior art disclosure of using polymers for buffer tubes having a 2500 psi modulus.

However such modulus measurements change relative to the point at which they are measured. For example the modulus of plastic changes during the extension of the plastic during extrusion processing, handling (as discussed in more detail below with respect to the tensile test tables). Likewise, the modulus of a plastic at the beginning of a tearing process would be much greater than at the end of the tearing process (tearing refers to the activity of pulling on a tube until it tears with the plastic yielding and fracturing for the purpose of opening to gain access to the fibers).

Another feature of fiber optic cable construction is the buffer tube wall thickness. Some tube wall thickness ranges recommended by the prior art are in the range of 0.2 mm to 0.3 mm (0.00787" to 0.0118") or roughly half what standard loose tube buffer tube wall thickness had been in the past 20 years (0.5 mm (0.0197")). Such prior art designs devote emphasis to 0.2 mm to 0.3 mm tube wall thickness ranges based on the ability to easily tear such tubes open for access to the fiber therein, or to have the strength in a semi-tube or patch cord construction providing protection when connectorized.

However, there are many other cable design features, such as overall cable diameter per number of fibers, mechanical, signal quality and fire/smoke standards, each that need to be addressed. One important aspect is the ability of the fibers to resist the contraction forces in such tight constraints or where the anti-buckling resistance of the fibers must match the contraction strength of the tube, at for example −60° C.

Likewise, fiber optic cable designs generally need to meet basic attenuation standards which are typically 3.0/1.0 dB per km at wavelengths of 850 and 1300 nm for multimode fiber and 0.4/0.3 dB per km at wavelengths of 1310 and 1500 nm for single mode fiber, with some related attenuation standards allow changes under shrinkage temperature standards which are typically set at less than 0.30 dB per km.

In addition to attenuation and attenuation under cold temperatures, other related mechanical testing issues may include but are not limited to—

Hot and Cold Bend (e.g. FOTP (FOTP=TIA Fiber Optic Test Procedure) 37A);
Room, and Cold Impact Resistance (e.g. FOTP-25C);
Compressive Strength (e.g. FOTP-41A);
Tensile Loading and Bending (e.g. FOTP-33A);
Twist (e.g. FOTP-85-A);
Cable Flexing (e.g. FOTP-104A);
Jacket Tensile Strength and Elongation (e.g. FOTP-89A);
Jacket Shrinkage (e.g. FOTP-86A);
Temperature Cycling (e.g. FOTP-3);
Cable Aging and Color Permanence (e.g. FOTP-3).

In each case, although the prior art suggests using thinner walled buffer tubes in their TL designs for certain access and connectorization issues, the thinner walls and lower amounts of free space for the fibers therein makes these tests more difficult to pass.

In addition to the above discussed mechanical and signal considerations, fiber optic cables also need to meet fire/smoke standards which may include the NFPA 262 Plenum Test also known by a prior name of UL 910 Test, where cables are laid side by side in an approximately 11¼" width and a 25 ft length, and subjected to flame and air flow whereby the measured flame length (red char) must be under a limit of 5 ft and where the smoke emitted must pass between an emitter and a detector with the calibrated peak limit of 0.5 (optical density—light intensity pass-through percentage reduction) and have an average limit for the duration of the test of less than 0.15.

One of the key fuels within the cable in such fire tests that produces smoke is the UV coating on the optical fibers. Prior art thin buffer tube wall designs (e.g. 0.20 mm-0.30 mm) make passing these types of fire/smoke tests more difficult than the normal wall thickness (0.50 mm) due to the faster exposure of the of the higher density UV fiber coatings (fuel) to the flame, and the higher density of the fiber coating within a given cable diameter.

Yet another issue with thinner walled buffer tubes is that the extrusion process for the TL sheaths is difficult to process because the excess fiber length must be controlled more precisely than in the larger buffer tubes having more space. When buffer tubes are extruded onto fibers, the fibers are provided with an excess length to give the fibers some range of movement within the tubes during bending, cold/warm temperature shrinkage/expansion, etc. . . . However, with thin walled buffer tubes with less open space for the fibers, there is much less space in which to accumulate the variability of excess fiber length, so the excess lengths of the fibers must be more tightly controlled.

OBJECTS AND SUMMARY

There is a need for a fiber optic cable that meets all of the above desired attenuation and mechanical testing standards in a cost effective and efficiently processable/manufacturable manner.

In accordance with one aspect off the invention, the free space in the interior of the tubes is defined, along with the jacket dimensions, as well as the materials used for these items such that they meet the minimum requirements for a Plenum (fire/smoke) rating.

To this end, the present arrangement provides for an optical fiber cable having a plurality of fiber optic elements including a glass portion and a UV optical coating portion. A plurality of buffer tubes each contain one or more of the plurality of optical fibers made of a fire retardant polymer. A jacket surrounds the buffer tubes also made of a fire retardant polymer. The fire retardant polymers for the plurality of buffer tubes and for the jacket are selected from PVDF (PolyVinyliDene Fluoride) or FRPVC (Fire Resistance Poly Vinyl Chloride). The ratio of total polymer to UV optical coating of the fiber optic elements, by area, is substantially in the range of 5:1 to 9:1.

BRIEF DESCRIPTION OF THE DRAWINGS

The present invention can be best understood through the following description and accompanying drawings, wherein.

DETAILED DESCRIPTION

Figure 3:
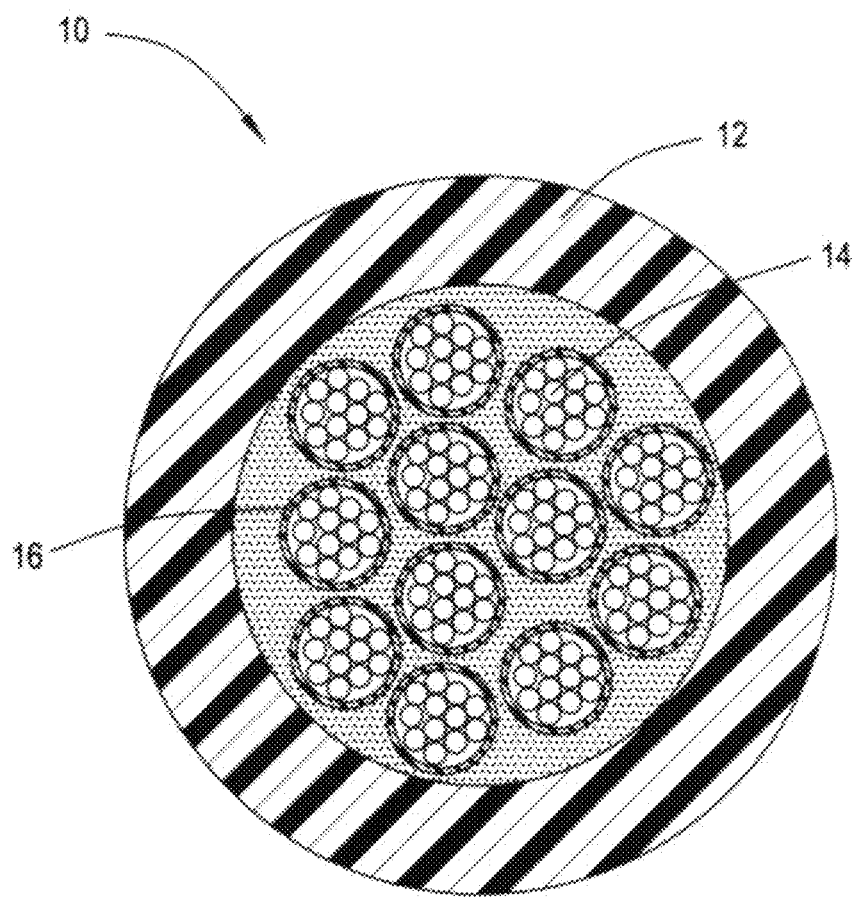
FIG. 3 shows a fiber optic cable according to one embodiment.
Figure 3A:
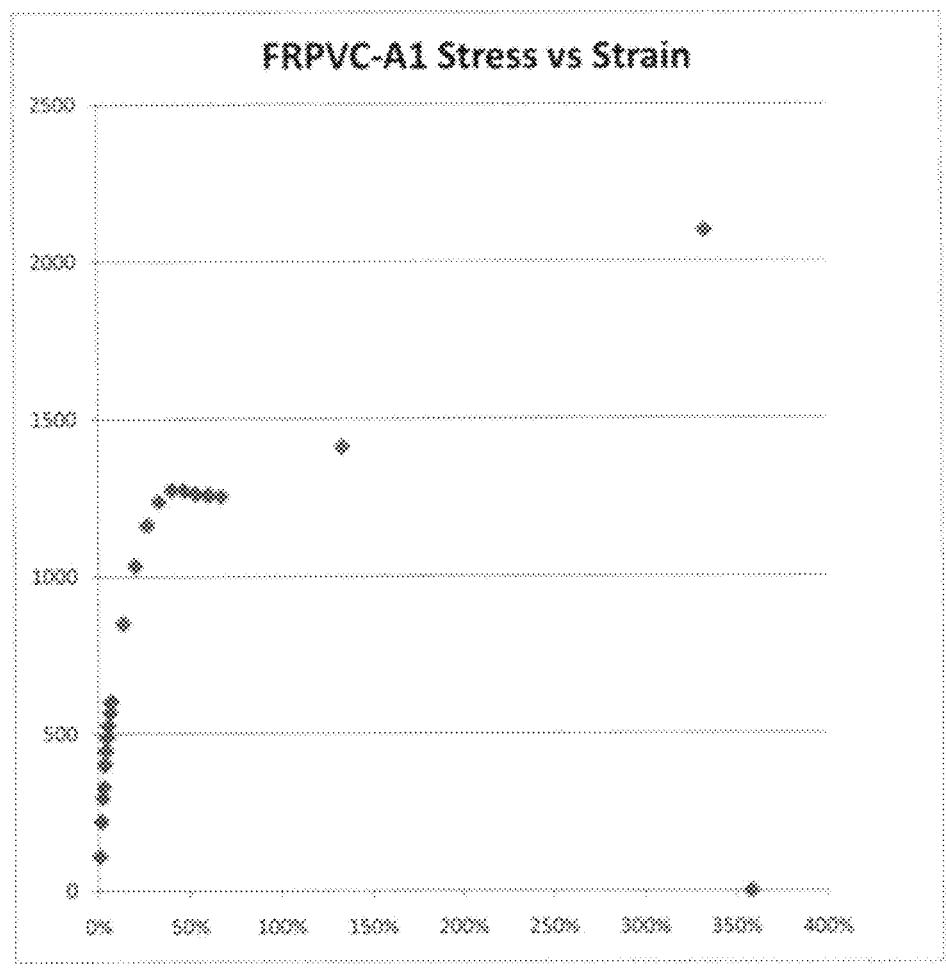
FIGS. 3A-3G are charts showing peak modulus versus elongation corresponding to Tables 1A-1G respectively.
Figure 3B:
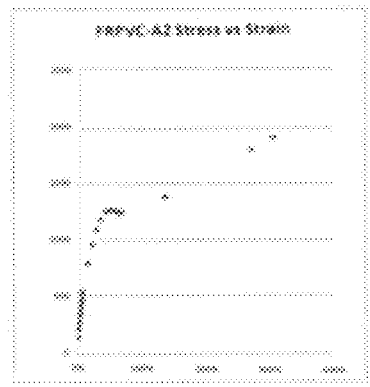
Figure 3C:
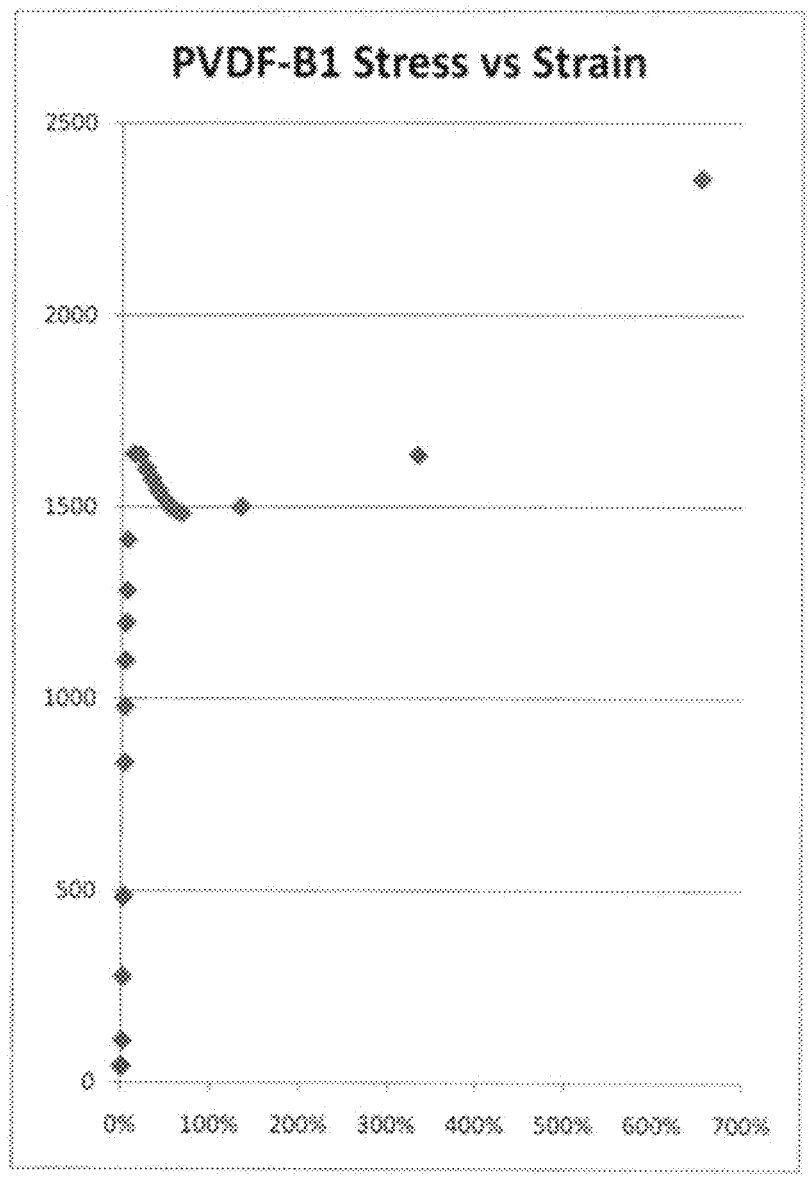
Figure 3D:
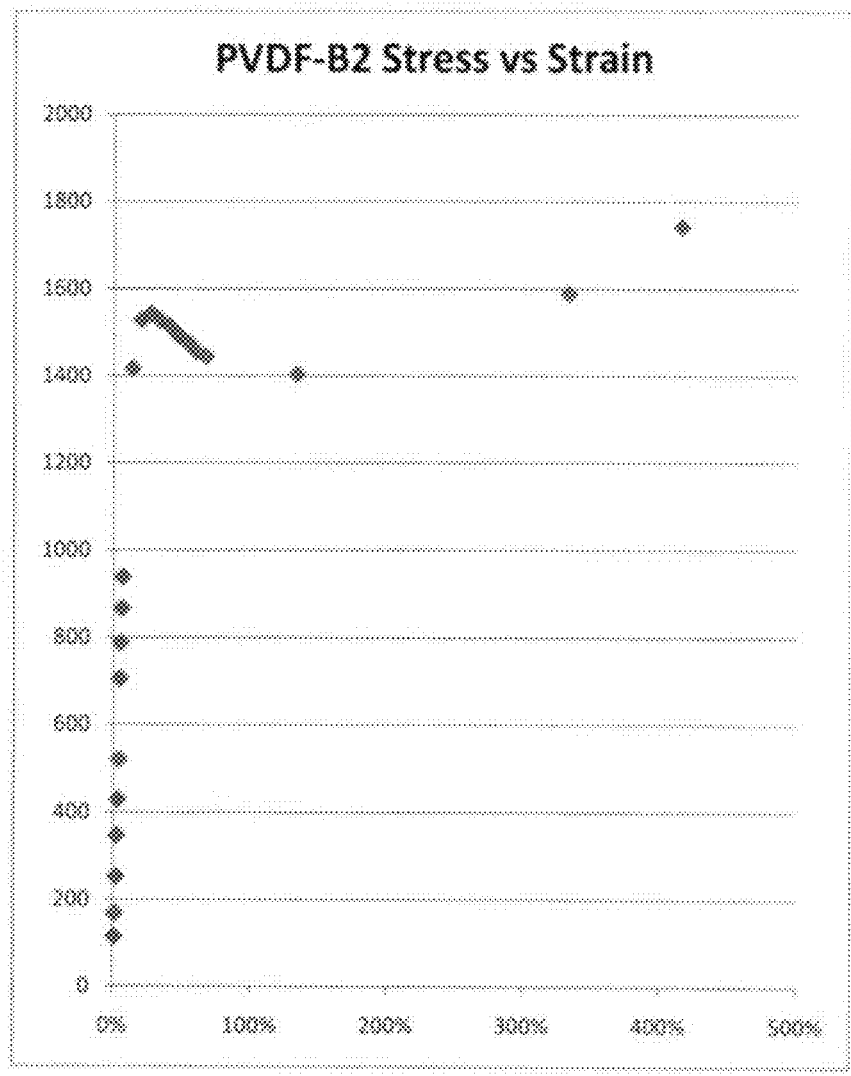
Figure 3E:
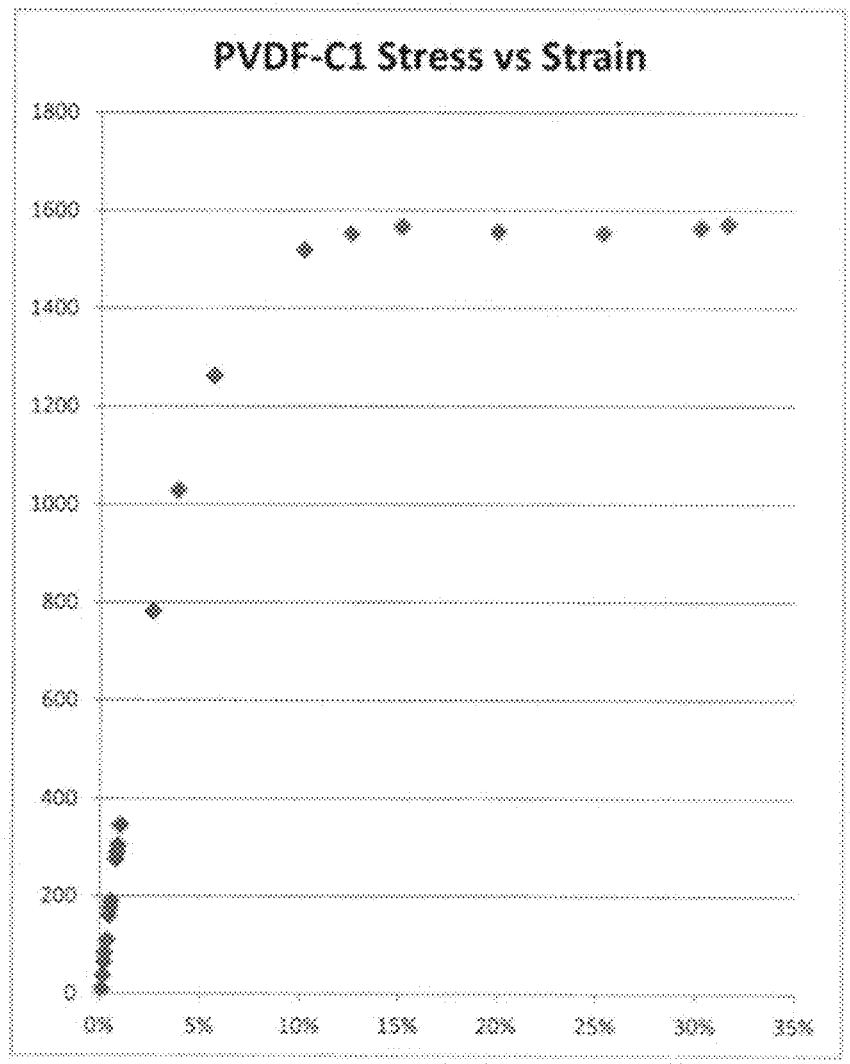
Figure 3F:
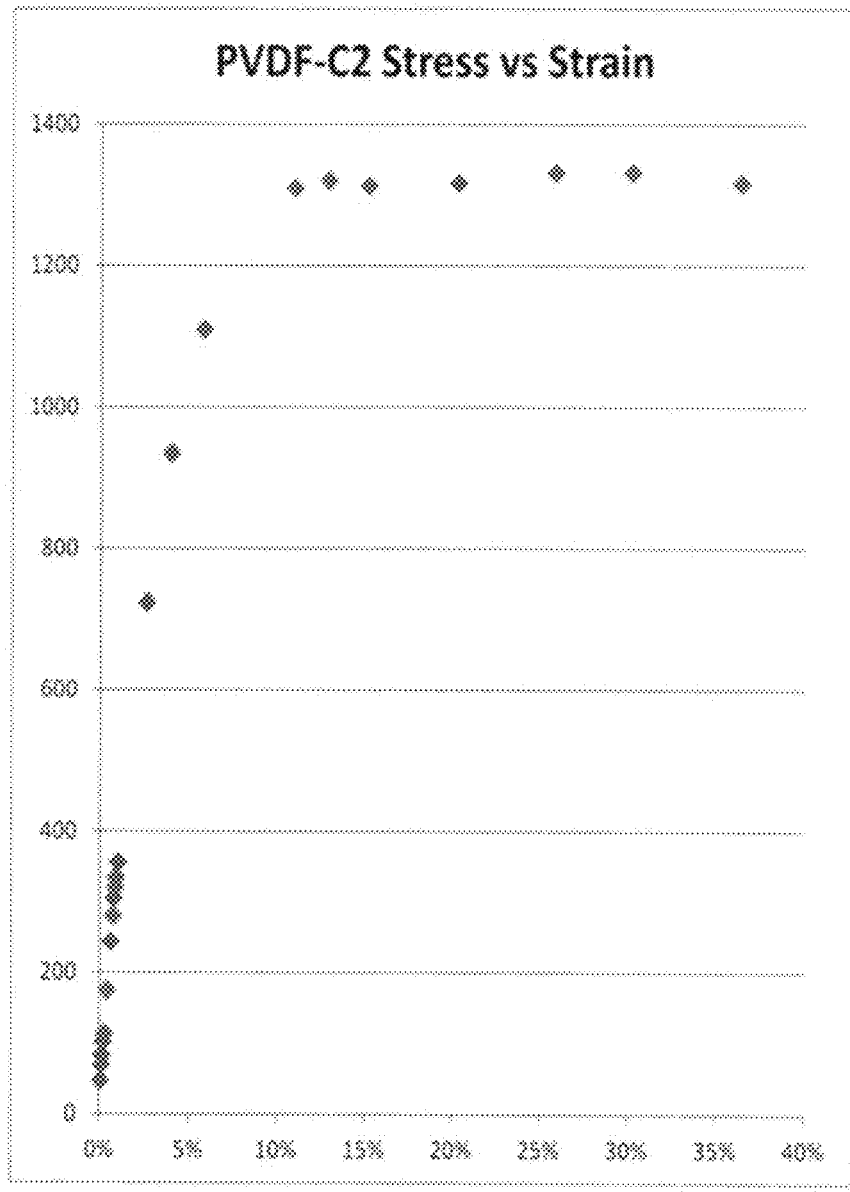
Figure 3G:
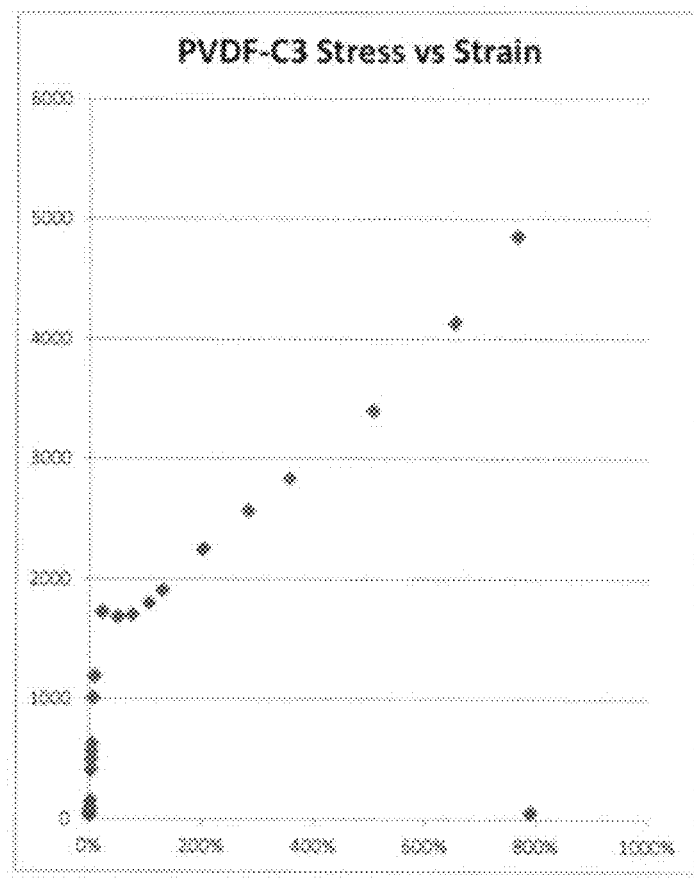
Figure 4:
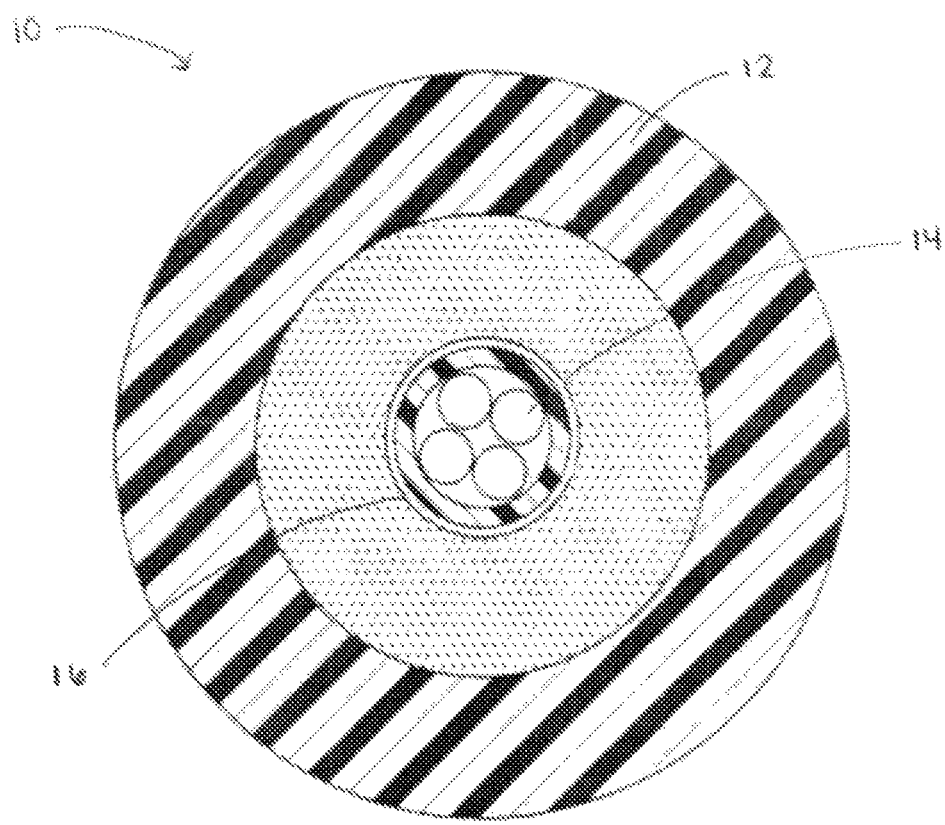
FIG. 4-25 show fiber optic cables according to variations of the cable shown in FIG. 3.
Figure 5:
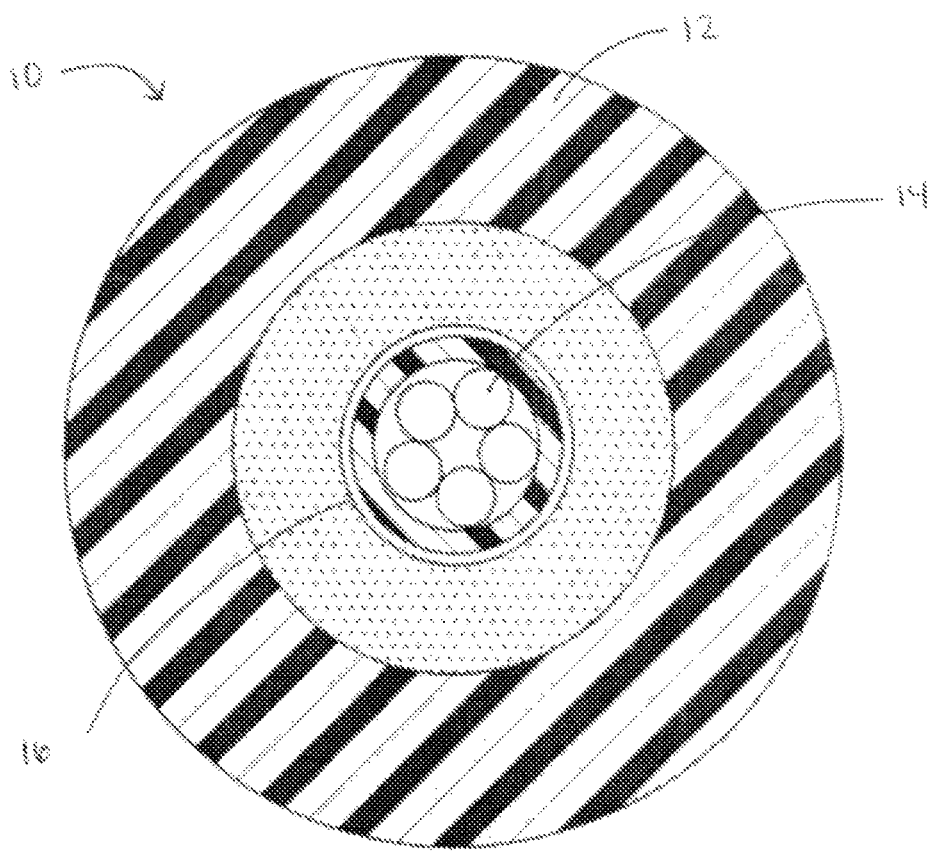
Figure 6:
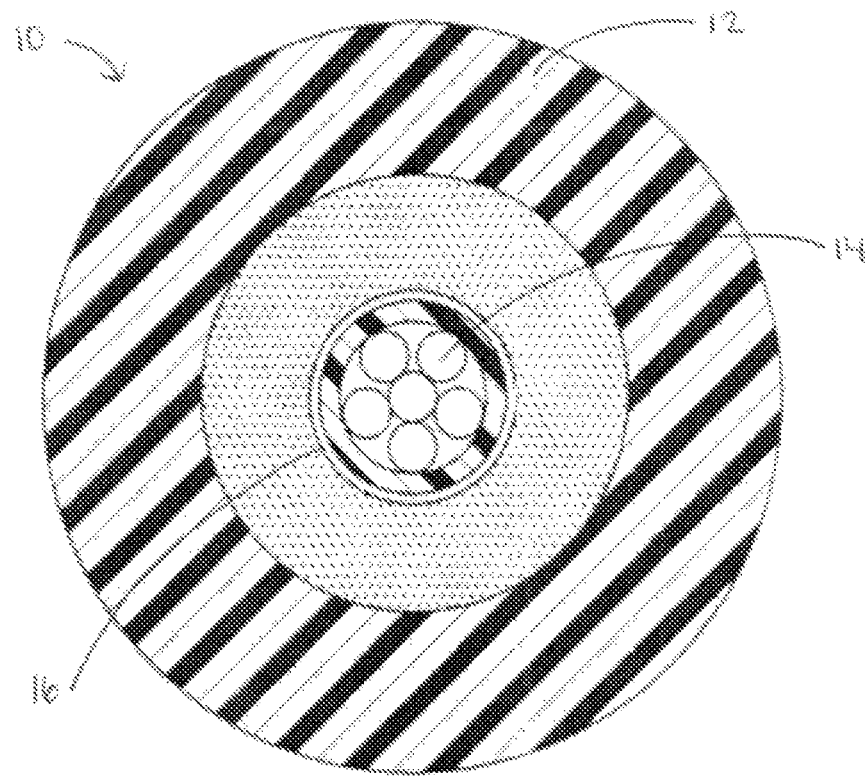
Figure 7:
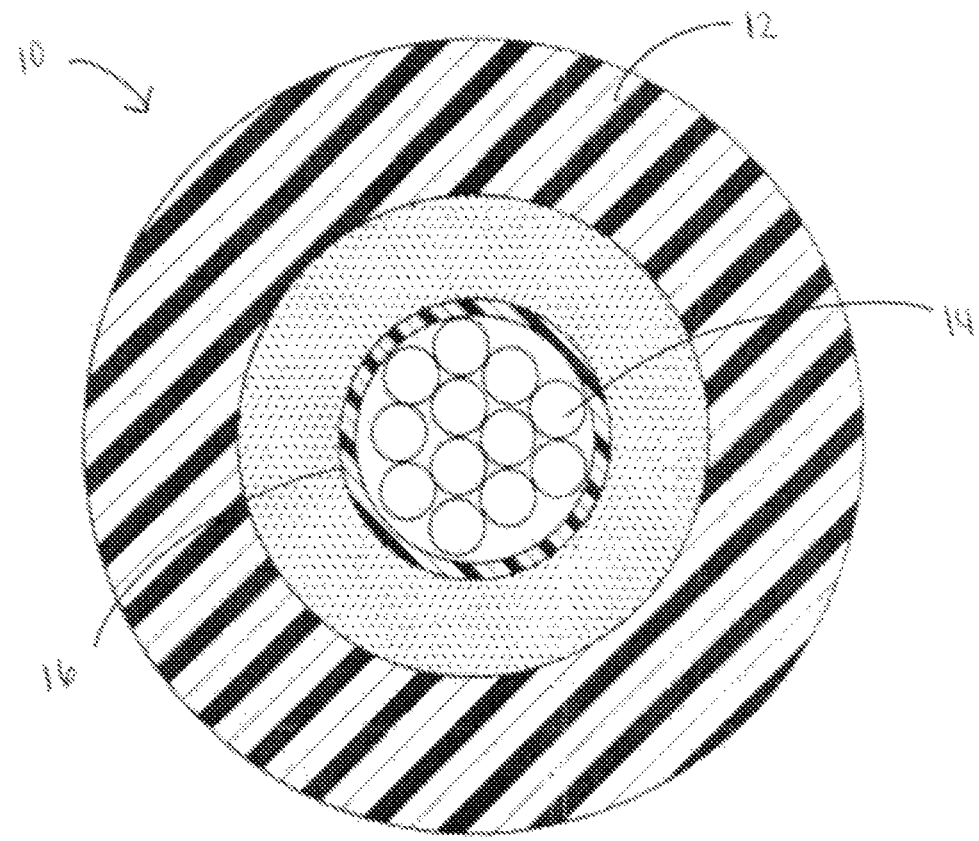
Figure 8:
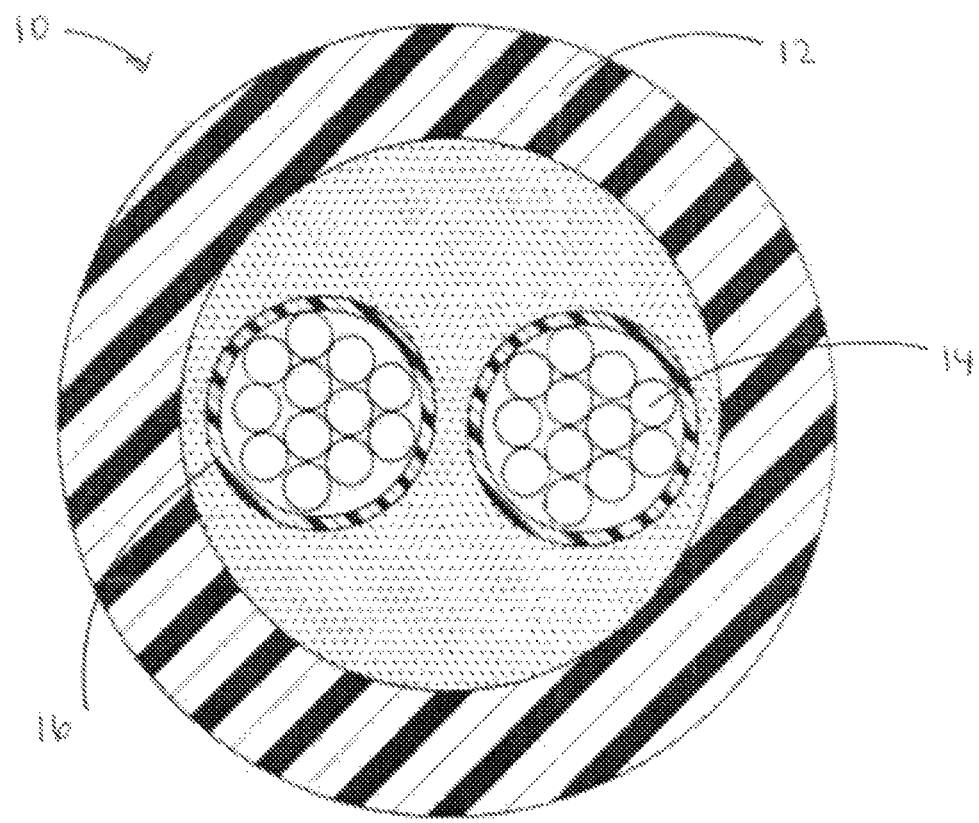
Figure 9:
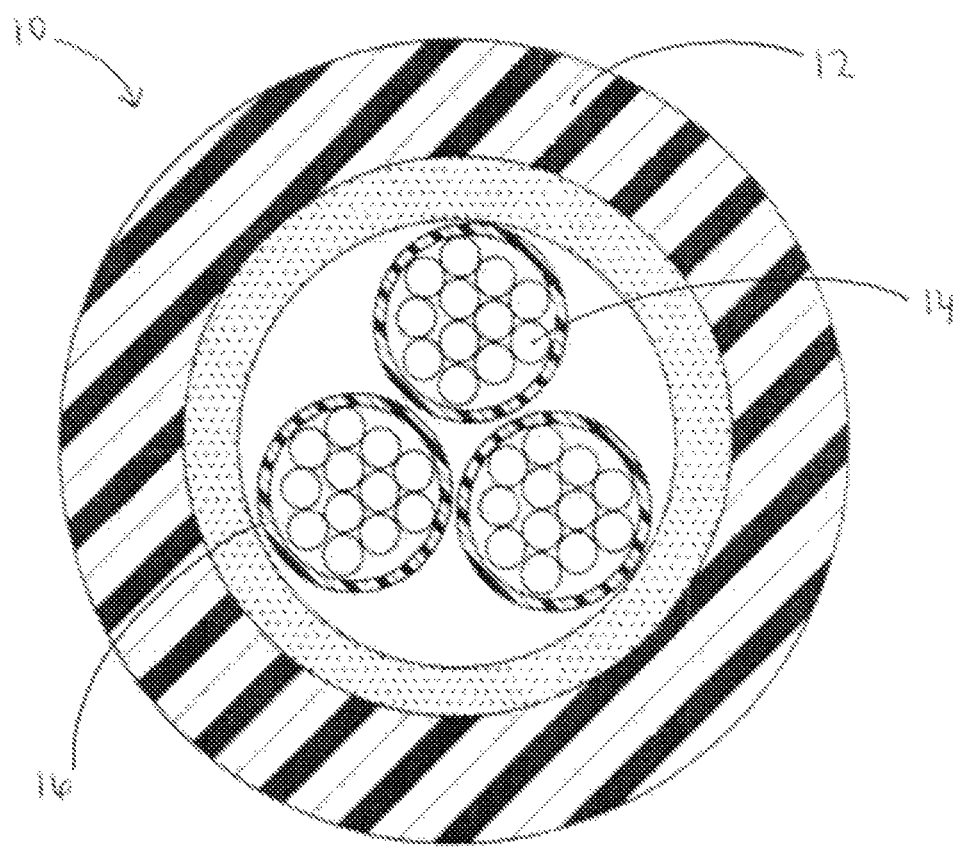
Figure 10:
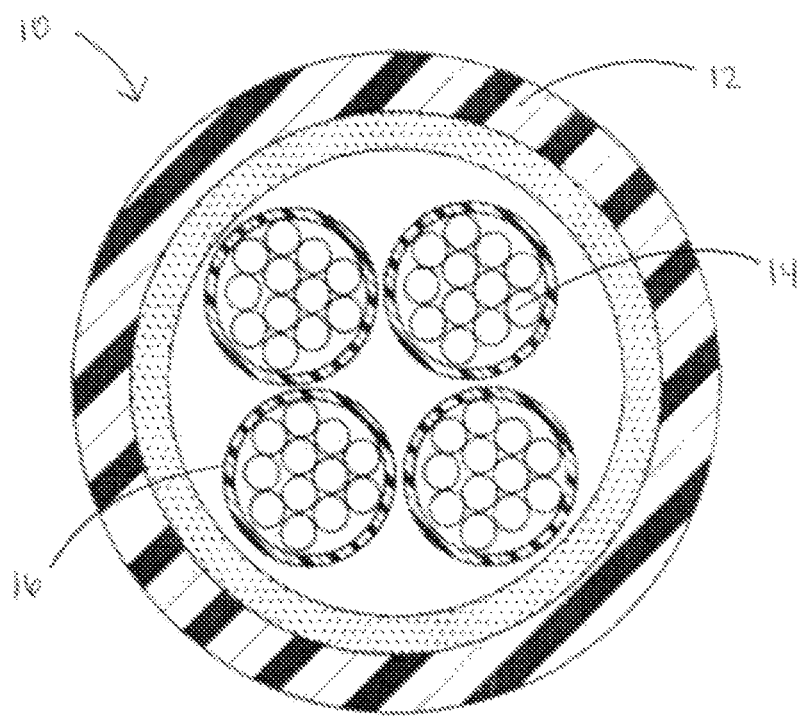
Figure 11:
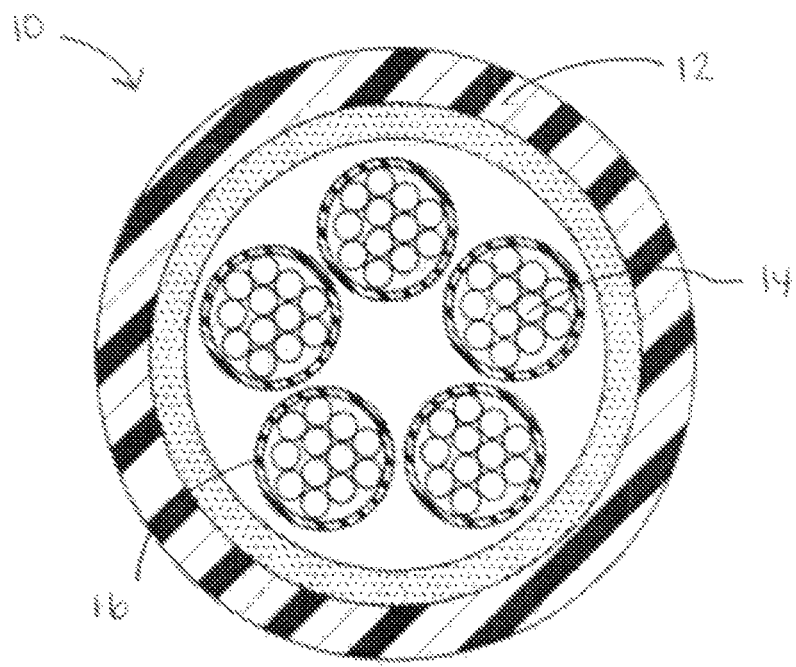
Figure 12:
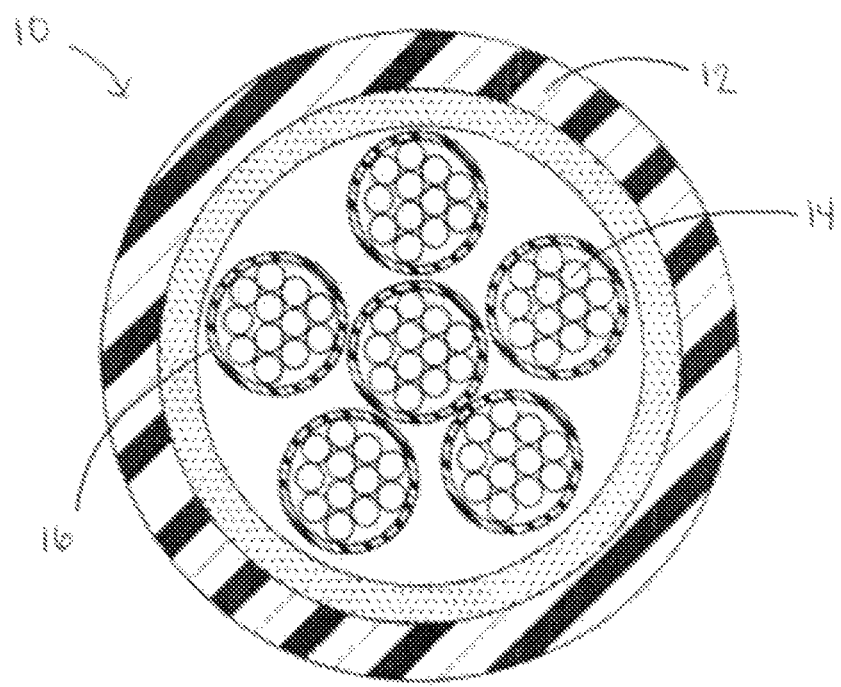
Figure 13:
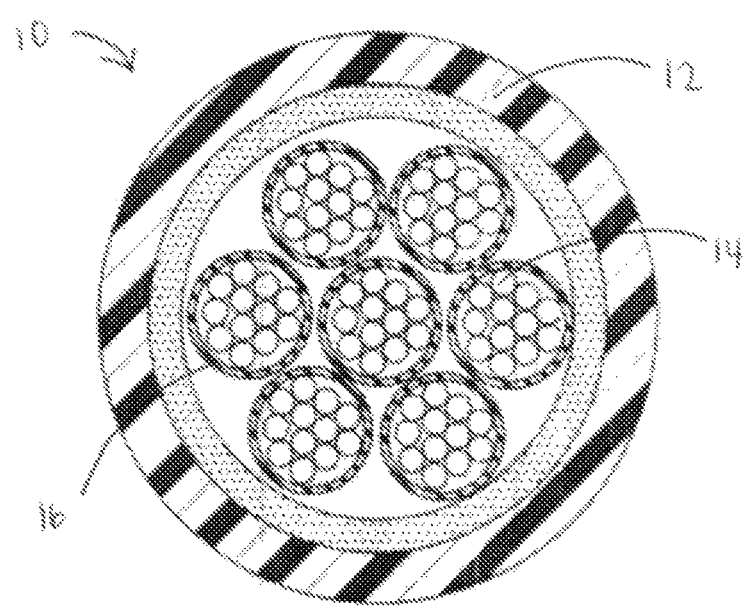
Figure 14:
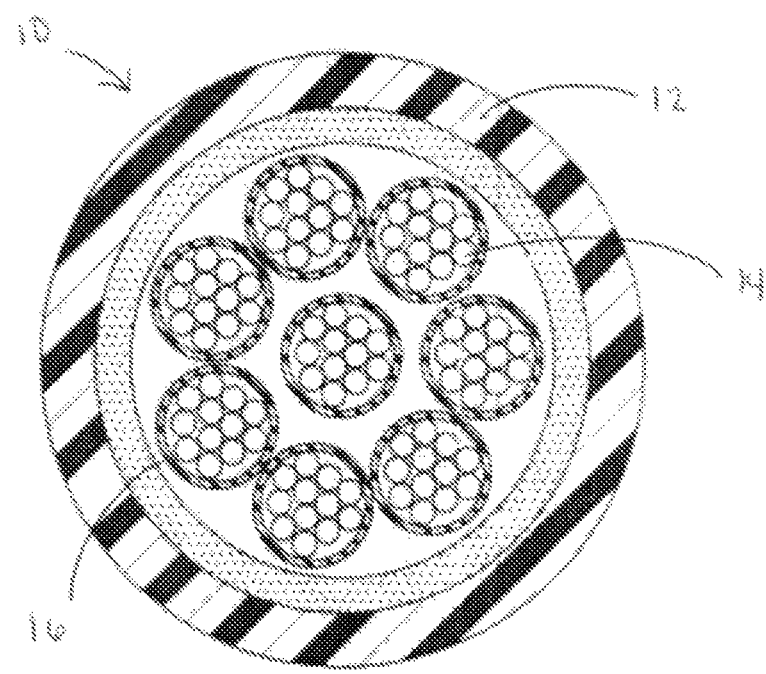
Figure 15:
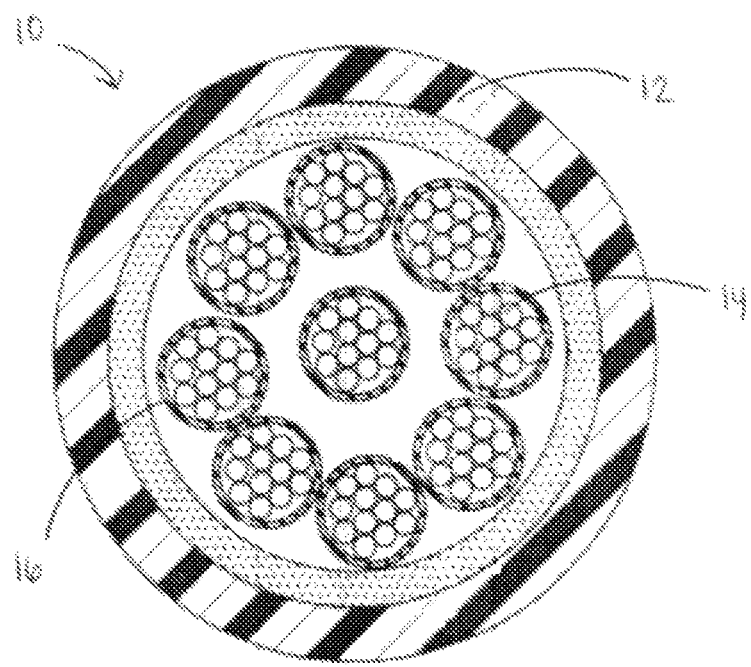
Figure 16:
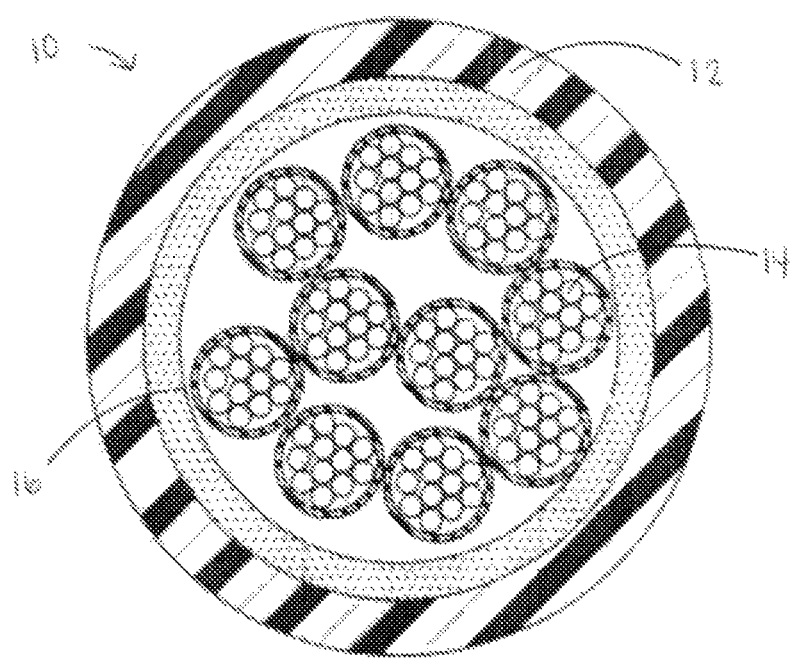
Figure 17:
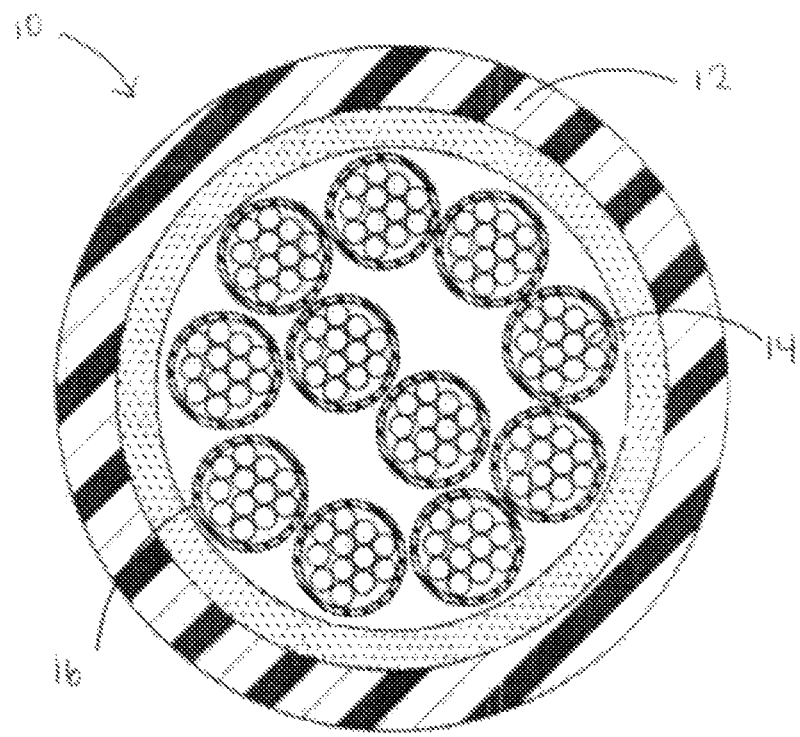
Figure 18:
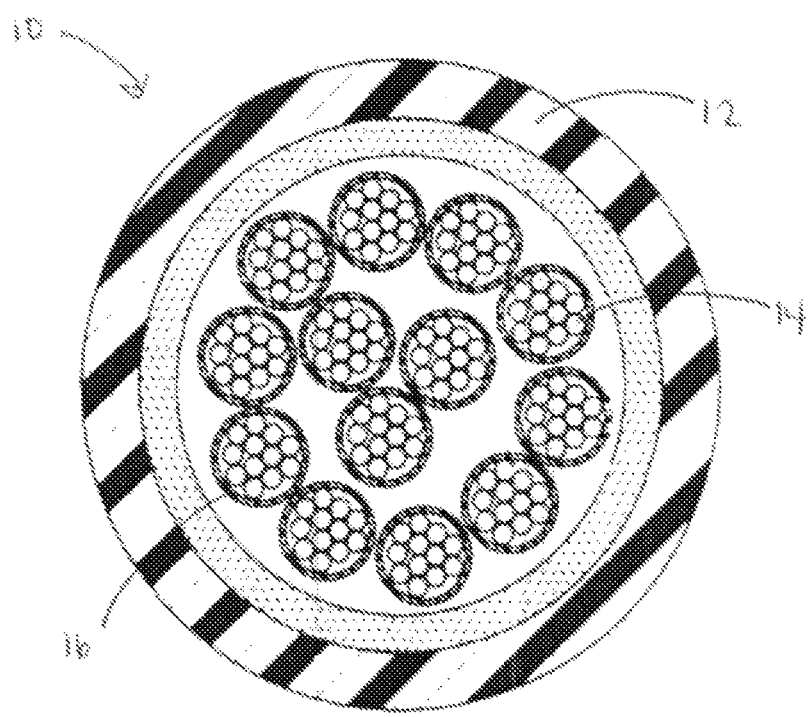
Figure 19:
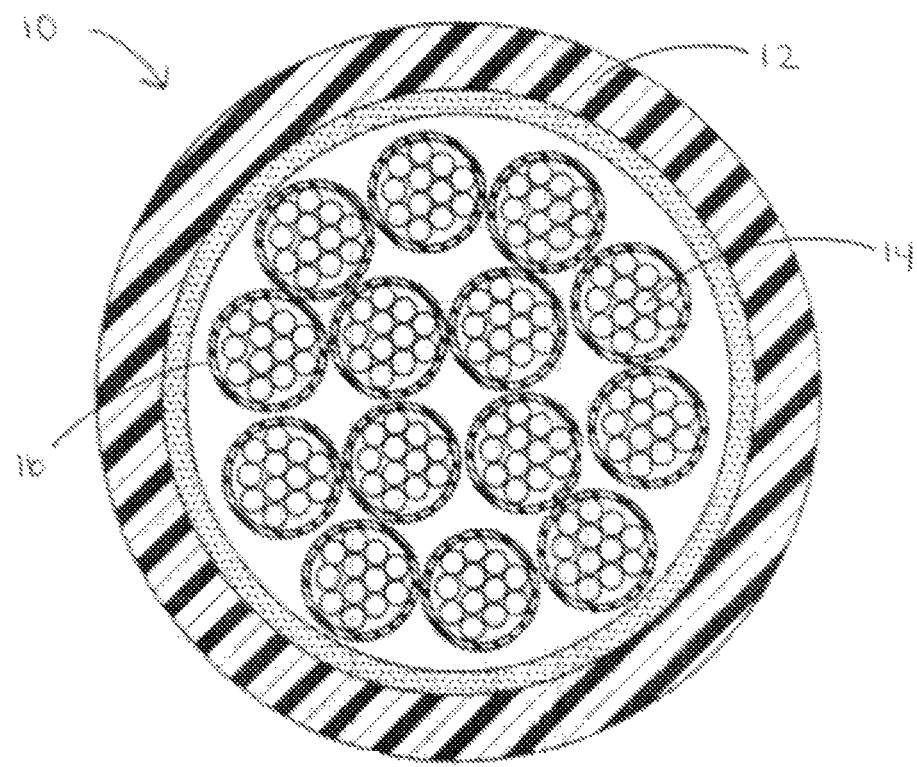
Figure 20:
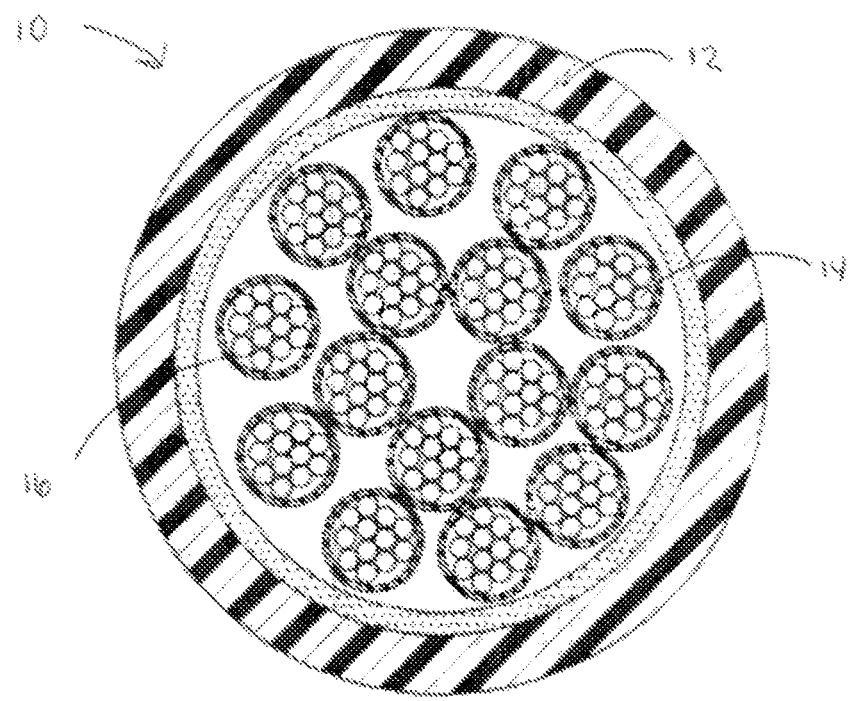
Figure 21:
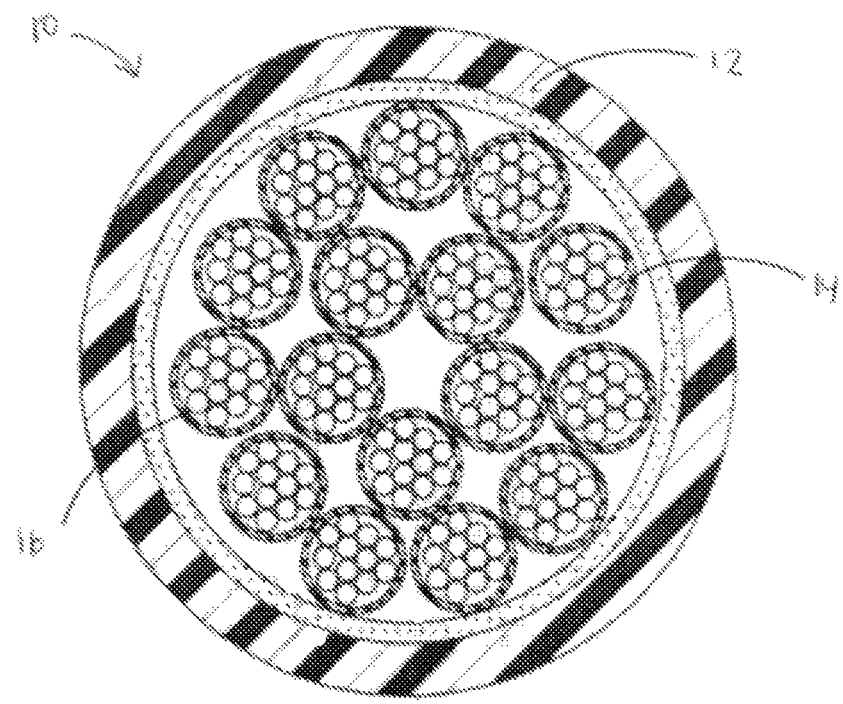
Figure 22:
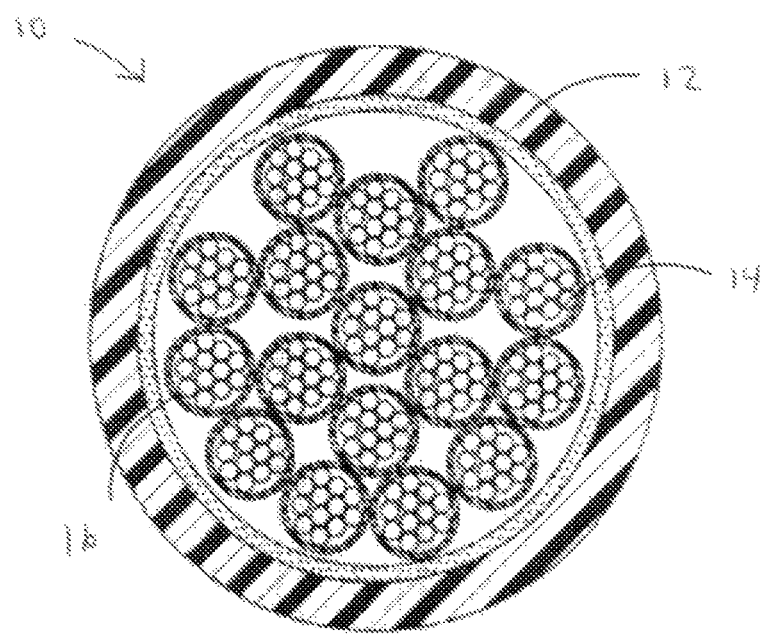
Figure 23:
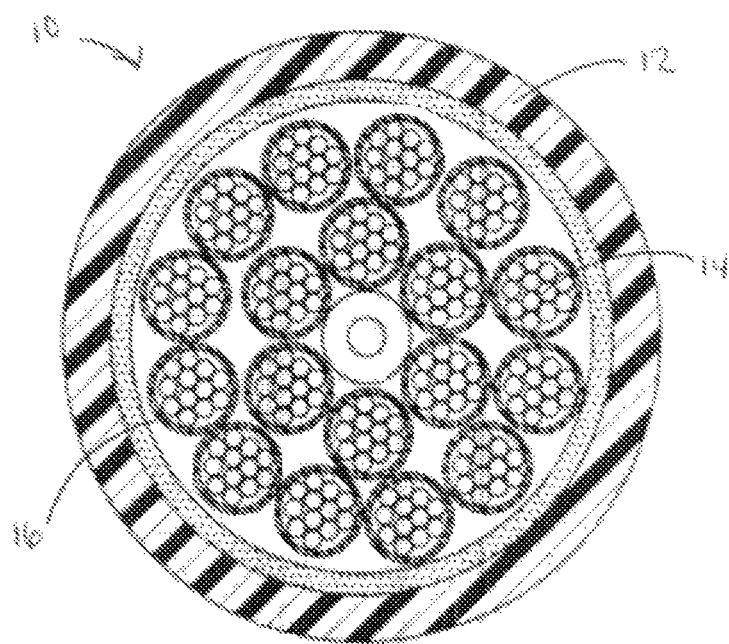
Figure 24:
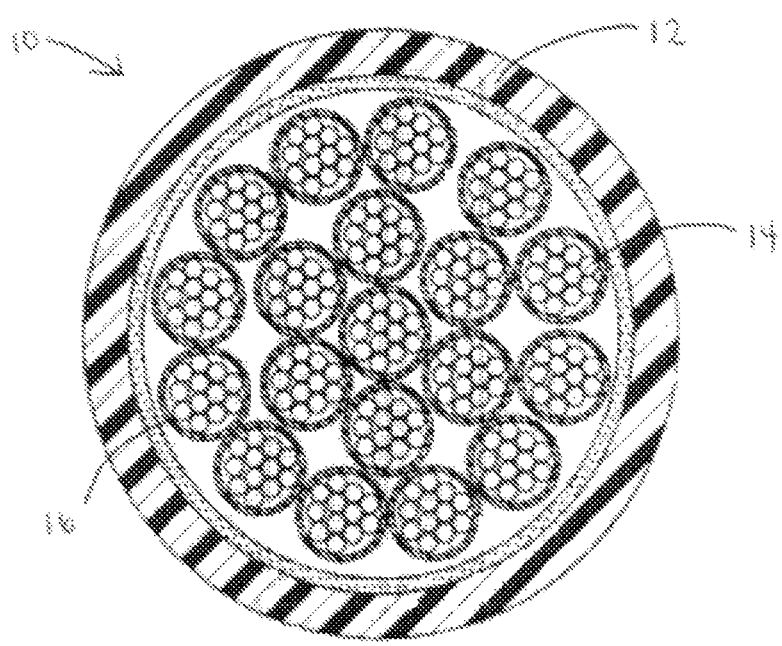
Figure 25:
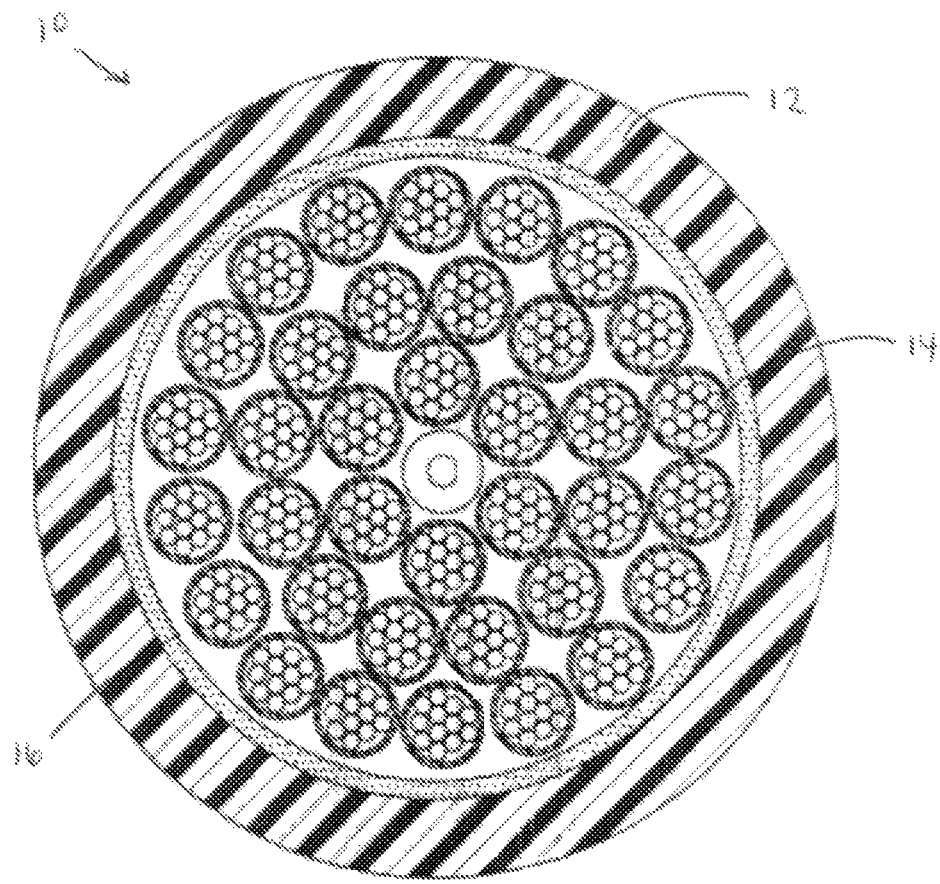

In one embodiment of the present arrangement shown in FIG. 3, a fiber optic cable 10 is shown having a jacket 12, one hundred and forty four (144) optical fibers 14, with fibers 14 grouped into twelve (12) buffer TL (Thin Walled Low interior Space) tubes 16 each with twelve fibers 14 therein.

Figure 1:
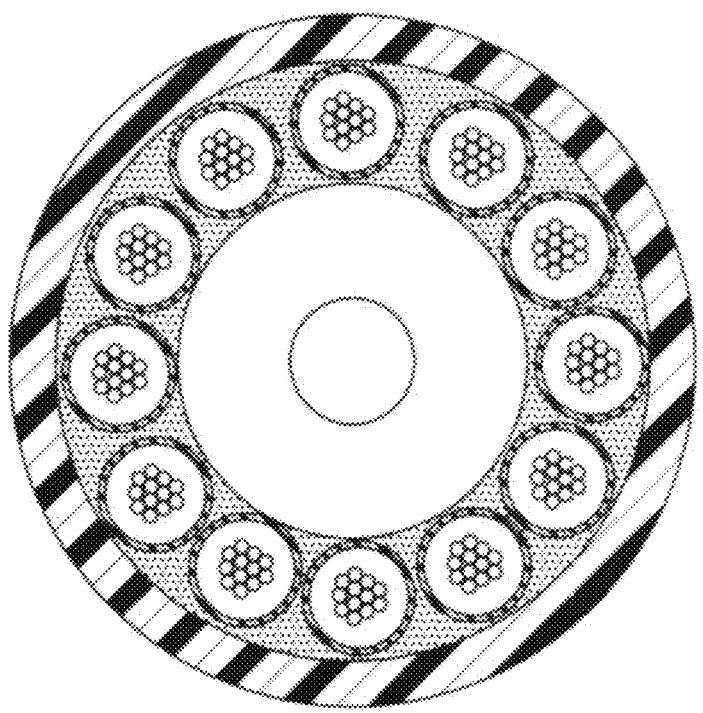
FIGS. 1-2 are prior art loose tube fiber optic cables.
Figure 2:
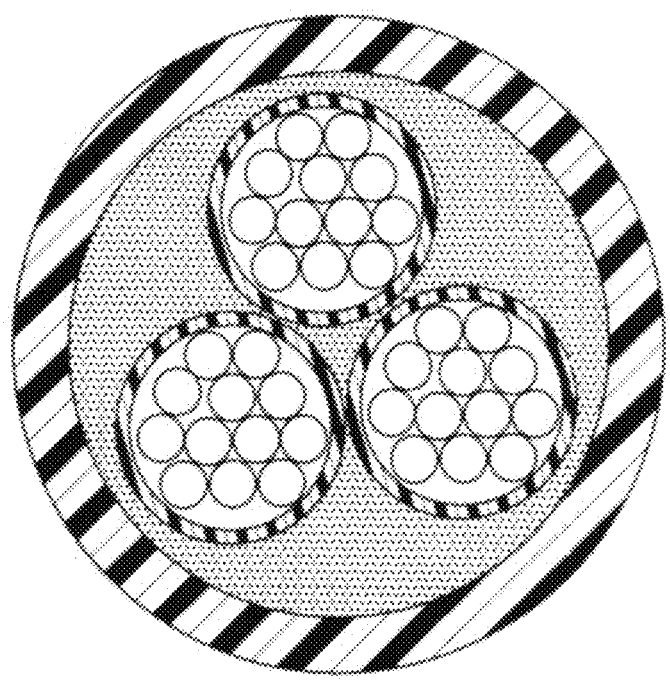

For the purposes of illustrating the salient features of the present arrangement, cable 10, shown in FIG. 1 is used to discuss the general features of the invention. Variations are shown in later figures and described in more detail below after the general discussion. For example, in FIG. 3, there are one hundred and forty four (144) fibers 16 in cable 10. However, it is readily understood by those of ordinary skill in the art that the features of the present arrangement may be employed in various sized cables ranging from mid-sized cables (12-200 fibers) and up to the larger 5000+ fibers.

In one embodiment, fibers 14 are typical UV coated optical fibers such as standard 250 micron UV coated fibers as well as bend resistant multimode and single mode fibers. It is understood that alternative styles of coated and uncoated optical fibers may be employed in the various embodiments under similar conditions.

In one embodiment, jacket 12 is constructed from a polymer such as PVFD (PolyVinyliDene Fluoride) or FRPVC (Fire Resistance Poly Vinyl Chloride), although other polymers may be used as desired. It is noted that PVDF and FRPVC both come in many different formulations, the details of which are discussed below.

Turning now to the construction of the buffer tubes 16 as with jacket 12, they may be constructed from a polymer such as PVDF (PolyVinyliDene Fluoride) or FRPVC (Fire Resistance Poly Vinyl Chloride), although other polymers may be used as desired.

Regarding the material selection for both jacket 12 and buffer tubes 16, there are various considerations that go into the material selection and constructions of such polymer tubes. Firstly, given the high density of fibers 14 (and thus high density of UV coating/fuel) it is preferable to use at least some PVDF, either as the material for buffer tube 16 or for jacket 12, due to PVDF's superior smoke/fire performance in the Plenum Test. To the extent PVDF is not used, the remaining components of tubes 16 and jacket 12 may be made from FRPVC.

Although FRPVC may not have as good of a low/cold temperature impact capability as the PVDF, FRPVC is a more flexible material and has a much lower cost. The PVDF on the other hand is a harder and more resilient material in the mechanical tests but its stiffness may act as a negative in some cases. In accordance with one embodiment of the invention, lower modulus PVDFs are used.

In general plastics have an initial rising peak Young's modulus which drops off as the plastic yields. This initial "peak" modulus can range from 5000 psi to 100,000 psi with tensile at ultimate elongation (after yield) that can range from 500 psi to 5000 psi at substantially 100% to 300% elongation.

In order to form the present cable 10, polymers of FRPVC and PVDF are selected for jacket 12 and buffer tubes 16 according to the following tables 1A-1G and associated FIGS. 3A-3G (explanations follow the table):

TABLE 1A

FRPVC-A1
Gage Length: (Inches) 1.5
Area: 0.01265
Width 0.253
Thickness 0.05

| gage length inches | lbs. | Length inches | Young's modulus | Strain | FRPVC-A1 Stress vs Strain |
|---|---|---|---|---|---|
| 1.5 | 1.38 | 0.01 | 16304 | 0.67% | 109 |
| 1.5 | 2.80 | 0.02 | 16601 | 1.33% | 221 |
| 1.5 | 3.73 | 0.03 | 14723 | 2.00% | 294 |
| 1.5 | 4.18 | 0.04 | 12376 | 2.67% | 330 |
| 1.5 | 5.08 | 0.05 | 12036 | 3.33% | 401 |
| 1.5 | 5.63 | 0.06 | 11117 | 4.00% | 445 |
| 1.5 | 6.18 | 0.07 | 10460 | 4.67% | 488 |
| 1.5 | 6.65 | 0.08 | 9857 | 5.33% | 526 |
| 1.5 | 7.18 | 0.09 | 9453 | 6% | 567 |
| 1.5 | 7.60 | 0.10 | 9012 | 7% | 601 |
| 1.5 | 10.75 | 0.20 | 6374 | 13% | 850 |
| 1.5 | 13.07 | 0.30 | 5166 | 20% | 1033 |
| 1.5 | 14.72 | 0.40 | 4364 | 27% | 1164 |
| 1.5 | 15.67 | 0.50 | 3716 | 33% | 1239 |
| 1.5 | 16.12 | 0.60 | 3186 | 40% | 1274 |
| 1.5 | 16.10 | 0.70 | 2727 | 47% | 1273 |
| 1.5 | 15.97 | 0.80 | 2367 | 53% | 1262 |
| 1.5 | 15.92 | 0.90 | 2097 | 60% | 1258 |
| 1.5 | 15.85 | 1.00 | 1879 | 67% | 1253 |
| 1.5 | 17.85 | 2.00 | 1058 | 133% | 1411 |
| 1.5 | 26.52 | 5.00 | 629 | 333% | 2096 |
| 1.5 | 0.00 | 5.37 | 0 | 358% | 0 |

Slope of 1st 7 readings 9063

TABLE 2A

FRPVC-A2
Gage Length: (Inches) 1.5
Area: 0.01265
Width 0.253
Thickness 0.05

| gage length inches | lbs. | Delta Length inches | Young's modulus | Strain | FRPVC-A2 Stress vs Strain |
|---|---|---|---|---|---|
| 1.5 | 1.70 | 0.01 | 20158 | 0.67% | 134 |
| 1.5 | 2.70 | 0.02 | 16008 | 1.33% | 213 |
| 1.5 | 3.40 | 0.03 | 13439 | 2.00% | 269 |
| 1.5 | 4.13 | 0.04 | 12228 | 2.67% | 326 |
| 1.5 | 4.68 | 0.05 | 11087 | 3.33% | 370 |
| 1.5 | 5.25 | 0.06 | 10375 | 4.00% | 415 |
| 1.5 | 5.75 | 0.07 | 9740 | 4.67% | 455 |
| 1.5 | 5.93 | 0.08 | 8782 | 5.33% | 468 |
| 1.5 | 6.48 | 0.09 | 8531 | 6% | 512 |
| 1.5 | 6.88 | 0.10 | 8152 | 7% | 543 |
| 1.5 | 9.93 | 0.20 | 5884 | 13% | 785 |
| 1.5 | 12.07 | 0.30 | 4771 | 20% | 954 |
| 1.5 | 13.82 | 0.40 | 4097 | 27% | 1092 |
| 1.5 | 15.02 | 0.50 | 3562 | 33% | 1187 |
| 1.5 | 15.85 | 0.60 | 3132 | 40% | 1253 |
| 1.5 | 16.05 | 0.70 | 2719 | 47% | 1269 |
| 1.5 | 16.02 | 0.80 | 2375 | 53% | 1266 |
| 1.5 | 15.80 | 0.90 | 2082 | 60% | 1249 |
| 1.5 | 15.85 | 1.00 | 1879 | 67% | 1253 |
| 1.5 | 17.62 | 2.00 | 1045 | 133% | 1393 |
| 1.5 | 23.00 | 4.00 | 682 | 267% | 1818 |
| 1.5 | 24.47 | 4.51 | 643 | 301% | 1934 |

Slope of 1st 7 readings 7845

TABLE 3A

PVDF-B1
Gage Length: (Inches) 1.5
Area: 0.007112
Width 0.254
Thickness 0.028

| gage length inches | lbs. | Length inches | Young's modulus | Strain | PVDF-B1 Stress vs Strain |
|---|---|---|---|---|---|
| 1.5 | 0.30 | 0.01 | 6327 | 0.67% | 42 |
| 1.5 | 0.77 | 0.02 | 8120 | 1.33% | 108 |
| 1.5 | 1.97 | 0.03 | 13850 | 2.00% | 277 |
| 1.5 | 3.45 | 0.04 | 18191 | 2.67% | 485 |
| 1.5 | 5.92 | 0.05 | 24972 | 3.33% | 832 |
| 1.5 | 6.97 | 0.06 | 24501 | 4.00% | 980 |
| 1.5 | 7.82 | 0.07 | 23562 | 4.67% | 1100 |
| 1.5 | 8.52 | 0.08 | 22462 | 5.33% | 1198 |
| 1.5 | 9.12 | 0.09 | 21372 | 6.00% | 1282 |
| 1.5 | 10.05 | 0.10 | 21197 | 6.67% | 1413 |
| 1.5 | 11.65 | 0.20 | 12286 | 13% | 1638 |
| 1.5 | 11.62 | 0.30 | 8169 | 20% | 1634 |
| 1.5 | 11.37 | 0.40 | 5995 | 27% | 1599 |
| 1.5 | 11.17 | 0.50 | 4712 | 33% | 1571 |
| 1.5 | 10.97 | 0.60 | 3856 | 40% | 1542 |
| 1.5 | 10.82 | 0.70 | 3260 | 47% | 1521 |
| 1.5 | 10.67 | 0.80 | 2813 | 53% | 1500 |
| 1.5 | 10.60 | 0.90 | 2484 | 60% | 1490 |
| 1.5 | 10.55 | 1.00 | 2225 | 67% | 1483 |
| 1.5 | 10.67 | 2.00 | 1125 | 133% | 1500 |
| 1.5 | 11.62 | 5.00 | 490 | 333% | 1634 |
| 1.5 | 16.75 | 9.79 | 361 | 653% | 2355 |

Slope of 1st 7 readings 29309

TABLE 4A

PVDF-B2
Gage Length: (Inches) 1.5
Area: 0.00711
Width 0.254
Thickness 0.028

| gage length inches | lbs. | Length inches | Young's modulus | Strain | PVDF-B2 Stress vs Strain |
|---|---|---|---|---|---|
| 1.5 | 0.82 | 0.01 | 17295 | 0.67% | 115 |
| 1.5 | 1.20 | 0.02 | 12655 | 1.33% | 169 |
| 1.5 | 1.80 | 0.03 | 12655 | 2.00% | 253 |
| 1.5 | 2.47 | 0.04 | 13024 | 2.67% | 347 |
| 1.5 | 3.05 | 0.05 | 12866 | 3.33% | 429 |
| 1.5 | 3.70 | 0.06 | 13006 | 4.00% | 520 |
| 1.5 | 5.02 | 0.07 | 15125 | 4.67% | 706 |
| 1.5 | 5.60 | 0.08 | 14764 | 5.33% | 787 |
| 1.5 | 6.17 | 0.09 | 14459 | 6.00% | 868 |
| 1.5 | 6.68 | 0.10 | 14089 | 6.67% | 939 |
| 1.5 | 10.07 | 0.20 | 10619 | 13% | 1416 |
| 1.5 | 10.87 | 0.30 | 7642 | 20% | 1528 |
| 1.5 | 10.97 | 0.40 | 5784 | 27% | 1542 |
| 1.5 | 10.87 | 0.50 | 4585 | 33% | 1528 |
| 1.5 | 10.77 | 0.60 | 3786 | 40% | 1514 |
| 1.5 | 10.62 | 0.70 | 3200 | 47% | 1493 |
| 1.5 | 10.5 | 0.80 | 2768 | 53% | 1476 |
| 1.5 | 10.35 | 0.90 | 2425 | 60% | 1455 |
| 1.5 | 10.27 | 1.00 | 2166 | 67% | 1444 |
| 1.5 | 9.98 | 2.00 | 1052 | 133% | 1403 |
| 1.5 | 11.30 | 5.00 | 477 | 333% | 1589 |
| 1.5 | 12.40 | 6.24 | 419 | 416% | 1744 |

Slope of 1st 7 readings 14199

TABLE 5A

PVDF-C1
Gage Length: (Inches) 20
Area: 0.00138
OD 0.06
ID 0.043

| gage length inches | lbs. | Length inches | Young's modulus | Strain | PVDF-C1 Stress vs Strain |
|---|---|---|---|---|---|
| 20 | 0.015 | 0.02 | 10907 | 0.10% | 11 |
| 20 | 0.05 | 0.03 | 24238 | 0.15% | 36 |
| 20 | 0.09 | 0.04 | 32722 | 0.20% | 65 |
| 20 | 0.12 | 0.05 | 33449 | 0.25% | 84 |
| 20 | 0.15 | 0.07 | 31164 | 0.35% | 109 |
| 20 | 0.22 | 0.09 | 35550 | 0.45% | 160 |
| 20 | 0.24 | 0.10 | 34903 | 0.50% | 175 |
| 20 | 0.26 | 0.11 | 34374 | 0.55% | 189 |
| 20 | 0.38 | 0.16 | 34540 | 0.80% | 276 |
| 20 | 0.40 | 0.17 | 34219 | 0.85% | 291 |
| 20 | 0.42 | 0.18 | 33934 | 0.90% | 305 |
| 20 | 0.48 | 0.20 | 34540 | 1.0% | 345 |
| 20 | 1.08 | 0.52 | 30065 | 2.6% | 782 |
| 20 | 1.415 | 0.77 | 26725 | 3.9% | 1029 |
| 20 | 1.74 | 1.13 | 22329 | 5.7% | 1262 |
| 20 | 2.09 | 2.03 | 14973 | 10.2% | 1520 |
| 20 | 2.14 | 2.51 | 12370 | 12.6% | 1552 |
| 20 | 2.155 | 3.02 | 10378 | 15.1% | 1567 |
| 20 | 2.14 | 4.00 | 7781 | 20.0% | 1556 |
| 20 | 2.14 | 5.06 | 6136 | 25.3% | 1552 |
| 20 | 2.15 | 6.04 | 5177 | 30.2% | 1563 |
| 20 | 2.16 | 6.31 | 4978 | 31.6% | 1571 |

Slope of 1st 7 readings 39787

TABLE 6A

PVDF-C2
Gage Length: (Inches) 20
Area: 0.00138
OD 0.06
ID 0.043

| gage length inches | lbs. | Length inches | Young's modulus | Strain | PVDF-C2 Stress vs Strain |
|---|---|---|---|---|---|
| 20 | 0.07 | 0.01 | 94529 | 0.05% | 47 |
| 20 | 0.10 | 0.02 | 69079 | 0.10% | 69 |
| 20 | 0.12 | 0.03 | 55748 | 0.15% | 84 |
| 20 | 0.14 | 0.04 | 50900 | 0.20% | 102 |
| 20 | 0.16 | 0.05 | 45083 | 0.25% | 113 |
| 20 | 0.24 | 0.08 | 43629 | 0.40% | 175 |
| 20 | 0.34 | 0.12 | 40599 | 0.60% | 244 |
| 20 | 0.39 | 0.15 | 37327 | 0.75% | 280 |
| 20 | 0.42 | 0.16 | 38175 | 0.80% | 305 |
| 20 | 0.44 | 0.17 | 37641 | 0.85% | 320 |
| 20 | 0.46 | 0.18 | 37165 | 1% | 334 |
| 20 | 0.49 | 0.20 | 35630 | 1% | 356 |
| 20 | 1.00 | 0.52 | 27827 | 3% | 724 |
| 20 | 1.29 | 0.79 | 23655 | 4% | 934 |
| 20 | 1.53 | 1.15 | 19285 | 6% | 1109 |
| 20 | 1.80 | 2.18 | 12008 | 11% | 1309 |
| 20 | 1.82 | 2.57 | 10271 | 13% | 1320 |
| 20 | 1.81 | 3.03 | 8663 | 15% | 1313 |
| 20 | 1.81 | 4.05 | 6499 | 20% | 1316 |
| 20 | 1.83 | 5.16 | 5158 | 26% | 1331 |
| 20 | 1.83 | 6.03 | 4414 | 30% | 1331 |
| 20 | 1.81 | 7.27 | 3621 | 36% | 1316 |

Slope of 1st 7 readings 35531

TABLE 7A

PVDF-C3
Gage Length: (Inches) 2
Area 0.00138
OD 0.06
ID 0.043

| gage length inches | lbs. | Length inches | Young's modulus | Strain | PVDF-C3 Stress vs Strain |
|---|---|---|---|---|---|
| 2 | 0.05 | 0.01 | 7271 | 0.50% | 36 |
| 2 | 0.08 | 0.02 | 5817 | 1.00% | 58 |
| 2 | 0.13 | 0.03 | 6060 | 1.50% | 91 |
| 2 | 0.21 | 0.04 | 7635 | 2.00% | 153 |
| 2 | 0.56 | 0.06 | 13573 | 3.00% | 407 |
| 2 | 0.68 | 0.07 | 14024 | 3.50% | 491 |
| 2 | 0.78 | 0.08 | 14089 | 4.00% | 564 |
| 2 | 0.86 | 0.09 | 13897 | 4.50% | 625 |
| 2 | 1.39 | 0.15 | 13477 | 7.50% | 1011 |
| 2 | 1.64 | 0.18 | 13250 | 9.00% | 1193 |
| 2 | 2.38 | 0.46 | 7509 | 23.00% | 1727 |
| 2 | 2.32 | 1.01 | 3341 | 50.50% | 1687 |
| 2 | 2.35 | 1.52 | 2244 | 76.00% | 1705 |
| 2 | 2.48 | 2.11 | 1709 | 105.50% | 1803 |
| 2 | 2.63 | 2.59 | 1477 | 129.50% | 1912 |
| 2 | 3.10 | 4.03 | 1117 | 201.50% | 2251 |
| 2 | 3.54 | 5.63 | 913 | 281.50% | 2570 |
| 2 | 3.90 | 7.08 | 800 | 354.00% | 2832 |
| 2 | 4.68 | 10.08 | 674 | 504.00% | 3399 |
| 2 | 5.69 | 13.02 | 635 | 651.00% | 4134 |
| 2 | 6.68 | 15.26 | 636 | 763.00% | 4854 |
| 2 | 0.08 | 15.79 | 7 | 789.50% | 58 |

Slope of 1st 7 readings 16558

In the context of the above tables 1A, 2A, 3A, 4A, 5A, 6A, 7A and FIGS. 3A-3G respectively—

Young's Modulus "peak" is the approximate highest in the columns above.

From such data and given additional input from the polymer suppliers of FRPVC and PVDF the following items are likewise calculated and taken into account when selecting materials for cable 10.

"range" in psi the range allows for variability of this particular plastic given the data;

"slope average"+"slope average range" is the slope calculation of the line approximately (in tables "B") as it rises rapidly. In the present examples, with the increments being measured, approximately the first seven points gave reasonable slope at this part of the line. This is the slope prior to the yield or change in direction, In the above shown tables the first 4 to 7 data points give nearly the same number;

"strain range" is the range that allows for variability of this particular plastic given the data;

"tensile Strength" of psi at X % elongation is shown in the last columns as compared to $2^{nd}$ to last column.

"hardness shore" from is a measurement from a Shore durometer that measure the hardness of a polymer. There are several scales of durometer, used for materials with different properties. The two most common scales, using slightly different measurement systems, are the ASTM D2240 type A and type D scales.

Turning now to general discussion of the wall thickness of buffer tubes 16, as discussed above, prior art shows wall thickness in various ranges from 0.5 mm down to a range from 0.2 mm in various different levels of tolerances. However, these sizes are too large and the ranges of wall thickness are too broad. On the contrary, the present arrangement, as discussed in more detail below uses a wall thickness range of 0.15 mm to 0.22 mm in conjunction with the polymer selections as discussed above and below in the later examples.

For example, in generating the present arrangement, eight TL style tubes 16, were made each having either a 0.15 mm wall or a 0.195 mm wall and various process parameters varied on each. Such tubes were made with twelve (12) fibers 14 using FRPVC (A1 and A2 as described above in Tables 1A and 2A respectively)

TABLE 8

| Sample | Wall | Fiber tension | Fibers Stranded | Attenuation at −60 C in dB/km |
| --- | --- | --- | --- | --- |
| 1 | 0.0195 | 100 | Yes | 0.31 |
| 2 | 0.015 | 50 | No | 0.1 |
| 3 | 0.0195 | 50 | No | 0.82 |
| 4 | 0.015 | 100 | Yes | 0.24 |
| 5 | 0.015 | 100 | No | 0.4 |
| 6 | 0.0195 | 50 | Yes | 0.2 |
| 7 | 0.0195 | 100 | No | 0.46 |
| 8 | 0.015 | 50 | Yes | 0.07 |

The attenuation at −60° C. for the 0.15 mm wall tubes 16 ranged from 0.07 to 0.4 db/km while the 0.195 mm wall tubes ranged from 0.2 to 0.82 db/km showing a preference for a thinner walled TL tubes 16. These same 8 runs were made with 50 or 100 grams fiber tension showing a range from 0.07 to 0.82 db/km for 50 grams and 0.24 to 0.46 db/km for 100 grams tension at −60° C., showing a preference for higher fiber tension of lower excess length. If the fibers are helically stranded within the TL tubes 16 the attenuation ranged from 0.07 to 0.31 db/km and for feeding in straight a range of 0.1 to 0.82 db/km showing a preference for helically placed units within the TL tube 16.

As such, the present arrangement preferably utilizes very thin walled buffer tubes 16 with fibers 14 under higher tension and stranded around one another within tubes 16. In one arrangement for example this is accomplished by feeding fibers 14 straightly in the sub-unit buffer tube 16 fabrication step and then by rigidly helically stranding units 16 in the next cable 10 assembly step. This imparts a twist (eg. 1 twist per 12") of optical fibers 14 within tubes 16, inherently as result of the 12" lay (eg. 1 twist per 12") of units/tube 16 around themselves.

Regarding the parameter of excess length of fibers 14 relative to tubes 16 and the ID of tubes 16, in the present arrangement, fiber excess length is preferably controlled within a much tighter window, within a delta length of −0.0005 to +0.0005 (or +/−0.0005) whereas prior art standard tubes with larger interior spaces are only typically controlled to −0.003 to +0.003.

For example a standard prior art tube has an ID of 2.0 mm translating to an area of 3.14 mm² and twelve (12) fibers therein each with a diameter of −0.25 mm translating to a group diameter of 4.15×0.250 mm or 1.0375 mm which results in a group area of 0.845 mm² leaving a free space area of 3.14−0.845 mm² or 2.29 mm²

Or a free space diameter ratio (2−1.0375)/2=48% or a ratio of approximately 2:1.

On the other hand, thin walled micromodule buffer tubes 16 of the present arrangement have interior ID of 1.2 mm or and area of 1.13 mm². A 12 (0.25 mm) fibers group area of 4.15 (hypothetical diameter of circle drawn around twelve (12) round objects grouped in a circle)×0.250 mm or 1.0375 mm group diameter with a group area of 0.845 mm² leaving a free space area of 1.13 mm²−0.845 mm² or 0.285 mm²

A free space diameter ratio (1.2−1.0375)/1.2=13.54% or a ratio of approximately 1.2:1.

Because in the present arrangement there is much less space inside tubes 16 (roughly 14% versus 48%), there is less space to accumulate the variability of excess fiber length, thus fibers 14 must be exposed to higher tensions down the extrusion line as the plastic contracts as it cools from its molten state. Fibers 14 must be kept under tension all the way to the extrusion take-up reel. Essentially fibers 14 must be kept under at delta extension of and approximate 0.001 delta length or a range of (0.0008 to 0.0012) tension, or six (6) times the length of the standard process.

This processing parameter additionally may leave fibers 14 under some residual tension so, as plastic tubes 16 cools on the reel, an approximate amount of 0.001 on the reel fibers 14 relax the same 0.001 delta length.

In addition to the above considerations, in order to accommodate the very thin walled tubes 16, the present arrangement also seeks to balance the type of plastic required to pass the plenum test (area required), but at the same time have a sufficiently low modulus to allow for flexibility.

In general TL buffers 16 designs have a higher fiber density and thus a higher somewhat less FR fiber coating density, and thus more negative fuel component per area for the plenum test.

In one arrangement of the present invention, an FRPVC is used for the TL tubes 16 where the FRPVC has
  Oxygen index of 64,
  300% tensile strength of 2095 psi,
  Young's Modulus to 0.3% strain of 12,000 psi,
  Peak Young's Modulus of 20,000 psi at 0.05% strain;
  5% Young's Modulus of 9000 psi; and
  Hardness 79 C.

In another arrangement of the present invention, a PVDF is used for jacket 12 or tubes 16, where the PVDF has
  Oxygen index of 57;
  300% tensile strength of 1600 psi;
  Young's Modulus to 0.3% strain of 42,000 psi;
  Peak Young's Modulus of 60,000 psi at 0.05% strain
  5% Young's Modulus of 20,000 psi; and
  Hardness 47 D.

In another arrangement of the present invention, an alternate PVDF is used for jacket 12, (or tubes) where the PVDF has:
  Oxygen index of 44;
  300% tensile strength of 2500 psi;
  Young's Modulus to 0.3% strain of 35,000 psi;
  Peak Young's Modulus of 69,000 psi at 0.05% strain
  5% Young's Modulus of 20,000 psi; and
  Hardness 57 D.

Regarding the balance of the use of FRPVC and PVDF in each of cables 10, because of the high density of fibers 14 therein some PVDF is used (e.g. on jacket 12) to meet the high fire/smoke ratings discussed above. In one example, some of the above PVDF may be used as either the material for buffer tubes 16 or jacket 12 or both, due to PVDF's superior performance in the Plenum Test. The above described FRPVC may be used to some extent on buffer tubes 16 or jacket 12 or both, but not completely when reaching fiber counts of 72 to 144.

In a first example, using the one hundred and forty four (144) fiber 16 cable 10 as shown in FIG. 3, tubes 16 are FRPVC and jacket 12 is PVDF.

Starting with the fire/smoke considerations, in this arrangement, it is noted that the area of the combustible UV coating on fibers 16 is based on dimensions of:
- 0.250 mm OD UV coated fiber OD with a core glass of 0.125 mm (glass is non fuel contributor)
- Thus, the area of UV coating from fibers 16 is
- $(0.250^2-0.125^2) \times \pi/4$ or
- 0.037 mm$^2 \times$144 fibers (in a 144 fiber count cable 10) or 5.33 mm$^2$ Such a UV coating amount, according to the present arrangement, should have a PVDF jacket 12 of
- $(9 \text{ mm}^2 - 6.75^2) \times \pi/4$ or
- 27.83 mm$^2$ which is approximately a ratio of PVDF to fiber of 27.83/5.33 or 5.22:1 PVDF to UV coating for jacket 12.

Additionally, each twelve (12) fibers 14 bundle is insulated from the fire source (e.g. in the test) by the buffer tube 16
- $(1.55^\wedge 2-1.2^\wedge 2) \times \pi/4$ or 0.756 mm$^2$ FRPVC over the 12$\times$0.037 mm$^2$ of coating or 0.444 mm$^2$.

This renders a ratio of 0.756/0.444 or 1.7:1 FRPVC to UV coating for tubes 16.

Adding both ratios together of 5.22 and 1.7=6.92:1 of FR plastic to coating area (or substantially 7.1 as referred to below in this example). Although this ratio is calculated using a one hundred and forty four (144) fiber 16 cable 10, this same ratio can be translated down to smaller cable counts of 72 fiber and 48 fiber counts etc. . . .

At least one advantage of such a ratio is that if allows for smaller overall cable construction diameters relative to the prior art. As noted above, in addition to all of the necessary mechanical and performance standards it is likewise desirable to keep the overall size (per number of fibers) small. Using the materials and tube sizing of prior art arrangements, cables having the same number of fibers are necessarily larger than the presently arranged cables.

For example, with standard prior art tube construction, the sizings and material selection only allow approximately 48 fibers within a 9 mm OD jacketed cable. And, in such arrangements, due to the lower fiber coating loading of 48$\times$0.037 mm$^2$ or 1.78 mm$^2$, the buffer tubes and jacket may in some cases be comprised of all of FRPVC. In some prior art cases all FRPVC construction is possible up to 72 fibers$\times$0.037 mm$^2$ or 2.66 mm$^2$ having a 12 mm OD. In other words, in prior art cables, because the fiber density is lower such arrangements can be made in all FRPVC construction but, are obviously less desirable than the present arrangement, because the cables are much larger (in OD) per fiber contained therein.

For example, in the prior art cases of the 48 and 72 fibers, the FRPVC areas are approximately
- $(3^2-2^2) \times \pi/4 \ast 4 + (9^2-6.75^2) \times \pi/4$ or 4 mm$^2 \times 4 + 28$ mm$^2$ or 44 mm$^2$/1.78 mm$^2$ or 24.7:1 for the 48 fiber and
- 4 mm$^2 \ast 6 + (12^2-9.75^2) \times \pi/4$ or 24+77 or 101 mm$^2$/2.66 mm$^2$ or a ratio of 38:1 for the 72 fiber design In prior art cables above a diameter of 12 mm, normally an all PVDF construction must be used unless further efforts are taken to insulate the fiber coating from the flame by incorporating a tight buffer coating up to 0.9 mm. In other words, in the prior art higher mid-count fiber optic cables of loose tube design must use more or all PVDF to meet the fire/smoke requirements, or they can simply move to TB (tight buffer) designs but that would greatly reduce the number of fibers in a cable for a given OD.

This is due to the fact that the standard test measures smoke generated from the side by side set of cables approximately 286 mms wide and the resulting rough area of prior art of 12 mm high (cable OD)$\times$286 mm wide for a fuel area of 3432 mm$^2$ where a prior art example seventy two (72) fibers are contained within, where an approximate 100% FRPVC can be used, however larger cables require PVDF to be used. In the prior art one hundred and forty four (144) fibers are contained within an approximate limit of 19 mm$\times$286 mm or 5434 mm$^2$ at which 50% percent of PVDF to FRPVC is used. This 50% is not a blend polymer but a comparison of percentages of total amounts of polymer used by component area.

Thus, in the present arrangement, the ratio of FR plastic (PVDF or PVC) area to fiber coating area is 7:1 (or in a range of 5:1 to 9:1) and the cable OD of cable 10 is approximately 9 mm or less. In this case, the "FR plastic to coating ratio" within the range of 5:1 to 9:1 includes the use of PVDF or even uses an all PVDF construction when the ratio is from 7:1 to 5:1.

With smaller diameter cables 10, and thus lower fiber counts, there is a higher FR plastic to coating ratios of 34:1 (e.g. for a 4 fiber cable) and 10:1 (e.g. for a 72 fiber cable) and, while smaller in cable diameter, the ratio is such that an all FRPVC utilization for the tubes 16 and jacket 12 is possible.

Thus, some use of both PVDF and FRPVC is required with the PVDF to FRPVC requirement of 50% or greater used when the FR plastic to fiber coating ratio is 7:1 or less. In constructions where the FR plastic (PVDF or PVC) to fiber coating area is less than 5:1 and the OD of cable 10 is greater than 12 then a ratio of PVDF to FRPVC of 70% or greater is used.

Turning now to some exemplary cable constructions, the following cables 10 are designs that substantially comport to the generally descried construction parameters above. In each case, cables 10 have a size and material selection that result in cables that have an overall small OD while meeting the necessary standard attenuation and fire/smoke plenum ratings.

In the examples, buffer tubes 16 are constructed with between twelve (12) fibers 14 therein (except in a few instances where the entire cable has less than twelve (12) fibers 14 and as many as twenty four (24) fibers 14 with a buffer tube 16 wall thickness of 0.15 mm to 0.195 mm using (for jacket 12 and tubes 16) an FRPVC with a Young's Modulus peak of 20,000 with a range of 19,000-21,000 psi and a slope average of 13,000 with a range of 12,000 to 14,000 psi between the 0.05% to 0.35% strain range, and a Tensile Strength of 1500-2500 psi at 250-350% elongation and a hardness shore C of 70-90; and/or a PVDF having a Oxygen index of 57, 300% tensile strength of 1600 psi, a Young's Modulus at 0.3% strain of 42,000 psi a peak Young's Modulus of 60,000 psi at 0.05% strain, at 5% strain a Young's Modulus of 20,000 psi and hardness 47D.

Moreover in the following examples fibers 14 are UV coated optical fibers, each 0.250 mm in diameter. Additionally, the inner diameter of buffer tube sheaths 16 are substantially 12-16%, preferably 14%, greater than the "bundle diameter" of optical fibers 14 within.

In the examples, a 250 to 350 dtex (decitex—measuring unit for yarn; 1 gram per 10000 meters) spun water blocking yarn can be added with the fibers. The yarn has an effective diameter 0.22 mm for the 250 dtex but is somewhat compressible to 0.20 mm. A 330 dtex yarn has an effective diameter of 0.25 mm but is somewhat compressible to 0.21 mm, the area range is 0.038 mm$^2$ to 0.049 mm$^2$.

When adding the yarn the group diameter (of fibers 16) is increased to 4.414$\times$0.250 mm or 1.1035 mm or a group area 0.956 mm$^2$. The ID range for tubes 16 is then increased (12-16%) to 1.14$\times$1.1035 or 1.258 mm to 1.18$\times$1.1035 or 1.3 mm.

FIGS. 4-25 show cable 10 having successively progressing fibers 14 from four (4) through four hundred and thirty two (432) shown in FIG. 3. Several examples are detailed in the following table 9 showing cables 10 ranging from four (4) to four hundred and thirty two (432) fibers 14, with twelve to sixteen (12-16) 1500 denier aramids and one (1) 1500-4500 denier aramid ripcord, optional ws (water swellable) powder, optional water swellable aramids or other yarns within tubes 16 and exterior to tubes 16 with mixes of FR PVC or PVDF TL tubes 16 and a PVDF jacket 12.

TABLE 9

| Coating Area mm^2 | 0.15 | 0.18 | 0.22 | 0.44 | 0.9 | 1.3 | 1.8 | 2.7 | 3.1 | 3.5 | 4.0 |
|---|---|---|---|---|---|---|---|---|---|---|---|
| Reduced Coating Area mm^2 | 0.08 | 0.10 | 0.11 | 0.23 | 0.5 | 0.7 | 0.9 | 1.4 | 1.6 | 1.8 | 2.1 |
| Added FR Area | 0.07 | 0.09 | 0.11 | 0.21 | 0.4 | 0.6 | 0.8 | 1.3 | 1.5 | 1.7 | 1.9 |
| fibers per unit | 4 | 5 | 6 | 12 | 12 | 12 | 12 | 12 | 12 | 12 | 12 |
| fiber group diameter multiplier | 2.4 | 2.7 | 3.0 | 4.2 | 4.2 | 4.2 | 4.2 | 4.2 | 4.2 | 4.2 | 4.2 |
| fiber group diameter mm | 0.6 | 0.7 | 0.8 | 1.0 | 1.0 | 1.0 | 1.0 | 1.0 | 1.0 | 1.0 | 1.0 |
| mm^2 | 0.3 | 0.4 | 0.4 | 0.8 | 0.8 | 0.8 | 0.8 | 0.8 | 0.8 | 0.8 | 0.8 |
| unit plastic id mm | 0.7 | 0.8 | 0.9 | 1.2 | 1.2 | 1.2 | 1.2 | 1.2 | 1.2 | 1.2 | 1.2 |
| unit plastic od mm | 1.0 | 1.1 | 1.2 | 1.5 | 1.5 | 1.5 | 1.5 | 1.5 | 1.5 | 1.5 | 1.5 |
| individual unit plastic area | 0.4 | 0.5 | 0.5 | 0.6 | 0.6 | 0.6 | 0.6 | 0.6 | 0.6 | 0.6 | 0.6 |
| number of units | 1 | 1 | 1 | 1 | 2 | 3 | 4 | 6 | 7 | 8 | 9 |
| total units plastic area mm^2 | 0.4 | 0.5 | 0.5 | 0.6 | 1.3 | 1.9 | 2.5 | 3.8 | 4.5 | 5.1 | 5.7 |
| unit group diamater multiplier | 1 | 1 | 1 | 1 | 2 | 2.15 | 2.41 | 3 | 3 | 3.3 | 3.61 |
| unit group diameter mm | 1.0 | 1.1 | 1.2 | 1.5 | 3.0 | 3.2 | 3.6 | 4.5 | 4.5 | 5.0 | 5.4 |
| unit group area mm^2 | 0.8 | 1.0 | 1.1 | 1.8 | 7.1 | 8.2 | 10.3 | 15.9 | 15.9 | 19.4 | 23.1 |
| aramid and air thickness (mm) | 0.9 | 0.9 | 0.8 | 0.7 | 0.5 | 0.5 | 0.4 | 0.3 | 0.3 | 0.3 | 0.3 |
| Jacket ID (mm) | 2.8 | 2.8 | 2.8 | 3.0 | 4.0 | 4.1 | 4.5 | 5.2 | 5.2 | 5.6 | 6.0 |
| Jacket Wall mm | 0.5 | 0.6 | 0.6 | 0.8 | 0.9 | 1.0 | 1.1 | 1.1 | 1.1 | 1.1 | 1.1 |
| Jacket OD mm | 3.8 | 3.9 | 4.1 | 4.5 | 5.7 | 6.2 | 6.7 | 7.5 | 7.5 | 7.9 | 8.3 |
| Jacket area mm^2 | 5.3 | 5.9 | 6.9 | 9.0 | 13.6 | 16.5 | 20.1 | 22.8 | 22.8 | 24.2 | 25.7 |
| Unit Free Space width mm | 0.08 | 0.09 | 0.11 | 0.16 | 0.16 | 0.16 | 0.16 | 0.16 | 0.16 | 0.16 | 0.16 |
| % Free Space width | 13% | 14% | 14% | 16% | 16% | 16% | 16% | 16% | 16% | 16% | 16% |
| Coating Area mm^2 | 4.4 | 4.9 | 5.3 | 8.0 | 8.8 | 9.7 | 10.6 | 11.5 | 12.4 | 13.3 | 15.9 |
| Reduced Coating Area mm^2 | 2.3 | 2.5 | 2.8 | 4.1 | 4.6 | 5.1 | 5.5 | 6.0 | 6.4 | 6.9 | 8.3 |
| Added FR Area | 2.1 | 2.3 | 2.5 | 3.8 | 4.2 | 4.7 | 5.1 | 5.5 | 5.9 | 6.4 | 7.6 |
| fibers per unit | 12 | 12 | 12 | 12 | 12 | 12 | 12 | 12 | 12 | 12 | 12 |
| fiber group diameter multiplier | 4.2 | 4.2 | 4.2 | 4.2 | 4.2 | 4.2 | 4.2 | 4.2 | 4.2 | 4.2 | 4.2 |
| fiber group diameter mm | 1.0 | 1.0 | 1.0 | 1.0 | 1.0 | 1.0 | 1.0 | 1.0 | 1.0 | 1.0 | 1.0 |
| mm^2 | 0.8 | 0.8 | 0.8 | 0.8 | 0.8 | 0.8 | 0.8 | 0.8 | 0.8 | 0.8 | 0.8 |
| unit plastic id mm | 1.2 | 1.2 | 1.2 | 1.2 | 1.2 | 1.2 | 1.2 | 1.2 | 1.2 | 1.2 | 1.2 |
| unit plastic od mm | 1.5 | 1.5 | 1.5 | 1.5 | 1.5 | 1.5 | 1.5 | 1.5 | 1.5 | 1.5 | 1.5 |
| individual unit plastic area | 0.6 | 0.6 | 0.6 | 0.6 | 0.6 | 0.6 | 0.6 | 0.6 | 0.6 | 0.6 | 0.6 |
| number of units | 10 | 11 | 12 | 18 | 20 | 22 | 24 | 26 | 28 | 30 | 36 |
| total units plastic area mm^2 | 6.4 | 7.0 | 7.6 | 11.5 | 12.7 | 14.0 | 15.3 | 16.5 | 17.8 | 19.1 | 22.9 |
| unit group diamater multiplier | 3.8 | 4 | 4 | 5 | 5.5 | 5.6 | 6.02 | 6.5 | 7 | 7 | 7 |
| unit group diameter mm | 5.7 | 6.0 | 6.0 | 7.5 | 8.3 | 8.4 | 9.0 | 9.8 | 10.5 | 10.5 | 10.5 |
| unit group area mm^2 | 25.8 | 28.3 | 28.6 | 44.2 | 53.5 | 55.4 | 64.0 | 74.7 | 86.6 | 86.6 | 86.6 |
| aramid and air thickness (mm) | 0.3 | 0.3 | 0.3 | 0.2 | 0.2 | 0.2 | 0.2 | 0.2 | 0.2 | 0.2 | 0.2 |
| Jacket ID (mm) | 6.3 | 6.5 | 6.6 | 7.9 | 8.7 | 8.8 | 9.4 | 10.1 | 10.9 | 10.9 | 10.8 |
| Jacket Wall mm | 1.1 | 1.1 | 1.1 | 1.1 | 1.1 | 1.1 | 1.1 | 1.1 | 1.1 | 1.1 | 1.1 |
| Jacket OD mm | 8.6 | 8.8 | 8.8 | 10.2 | 11.0 | 11.1 | 11.7 | 12.4 | 13.1 | 13.1 | 13.1 |
| Jacket area mm^2 | 26.7 | 27.6 | 27.7 | 32.6 | 35.3 | 35.7 | 37.9 | 40.4 | 43.1 | 43.1 | 42.9 |
| Unit Free Space width mm | 0.16 | 0.16 | 0.16 | 0.16 | 0.16 | 0.16 | 0.16 | 0.16 | 0.16 | 0.16 | 6.16 |
| % Free Space width | 16% | 16% | 16% | 16% | 16% | 16% | 16% | 16% | 16% | 16% | 16% |

| MDP 4-432 | | | | | | | | | | | |
|---|---|---|---|---|---|---|---|---|---|---|---|
| Fiber Count | 4 | 5 | 6 | 12 | 24 | 36 | 48 | 72 | 84 | 96 | 108 |
| unit plastic id mm | 0.7 | 0.77 | 0.9 | 1.2 | 1.2 | 1.2 | 1.2 | 1.2 | 1.2 | 1.2 | 1.2 |
| unit plastic od mm | 1 | 1.1 | 1.2 | 1.5 | 1.5 | 1.5 | 1.5 | 1.5 | 1.5 | 1.5 | 1.5 |
| Cable OD | 3.8 | 3.9 | 4.1 | 4.5 | 5.7 | 6.2 | 6.7 | 7.5 | 7.5 | 7.9 | 8.3 |
| FR Plastic to coating ratio | 39 | 35 | 34 | 22 | 17 | 14 | 13 | 10 | 9 | 8 | 8 |
| FR Plastic/reduced coating | 75 | 68 | 65 | 43 | 33 | 28 | 26 | 20 | 18 | 17 | 16 |

| MDP 4-432 | | | | | | | | | | | |
|---|---|---|---|---|---|---|---|---|---|---|---|
| Fiber Count | 120 | 132 | 144 | 216 | 240 | 264 | 288 | 312 | 336 | 360 | 432 |
| unit plastic id mm | 1.2 | 1.2 | 1.2 | 1.2 | 1.2 | 1.2 | 1.2 | 1.2 | 1.2 | 1.2 | 1.2 |
| unit plastic od mm | 1.5 | 1.5 | 1.5 | 1.5 | 1.5 | 1.5 | 1.5 | 1.5 | 1.5 | 1.5 | 1.5 |
| Cable OD | 8.6 | 8.8 | 8.8 | 10.2 | 11.0 | 11.1 | 11.7 | 12.4 | 13.1 | 13.1 | 13.1 |
| FR Plastic to coating ratio | 7 | 7 | 7 | 6 | 5 | 5 | 5 | 5 | 5 | 5 | 4 |
| FR Plastic/reduced coating | 15 | 15 | 14 | 12 | 11 | 11 | 11 | 10 | 10 | 10 | 9 |

The lower portion of table 9 shows a summary with the upper portion giving the full details. Such a table illustrates the suing advantages based on the above described construction of tubes 16 and jacket 12, which meet the required mechanical and smoke testing requirements.

On the contrary, the following table 10 and the lower summary portion illustrate the various FR plastic ratio and sizes that result from prior art construction parameters as described above, showing larger cables.

TABLE 10

Estimated Prior Art

| # fibers | 4 | 5 | 6 | 12 | 24 | 36 | 48 | 72 | 84 | 96 | 108 | 120 |
|---|---|---|---|---|---|---|---|---|---|---|---|---|
| Coating Area mm^2 | 0.15 | 0.18 | 0.22 | 0.44 | 0.9 | 1.3 | 1.8 | 2.7 | 3.1 | 3.5 | 4.0 | 4.4 |
| Reduced Coating Area mm^2 | 0.08 | 0.10 | 0.11 | 0.23 | 0.5 | 0.7 | 0.9 | 1.4 | 1.6 | 1.8 | 2.1 | 2.3 |
| Added FR Area | 0.07 | 0.09 | 0.11 | 0.21 | 0.4 | 0.6 | 0.8 | 1.3 | 1.5 | 1.7 | 1.9 | 2.1 |
| fibers per unit | 4 | 5 | 6 | 12 | 12 | 12 | 12 | 12 | 12 | 12 | 12 | 12 |
| fiber group diameter multiplier | 2.4 | 2.7 | 3.0 | 4.2 | 4.2 | 4.2 | 4.2 | 4.2 | 4.2 | 4.2 | 4.2 | 4.2 |
| fiber group diameter mm | 0.6 | 0.7 | 0.8 | 1.0 | 1.0 | 1.0 | 1.0 | 1.0 | 1.0 | 1.0 | 1.0 | 1.0 |
| fiber group diameter area mm^2 | 0.3 | 0.4 | 0.4 | 0.8 | 0.8 | 0.8 | 0.8 | 0.8 | 0.8 | 0.8 | 0.8 | 0.8 |
| unit plastic id mm | 0.7 | 0.8 | 0.9 | 1.1 | 1.1 | 1.1 | 1.1 | 1.1 | 1.1 | 1.1 | 1.1 | 1.1 |
| unit plastic od mm | 1.0 | 1.1 | 1.2 | 1.7 | 1.7 | 1.7 | 1.7 | 1.7 | 1.7 | 1.7 | 1.7 | 1.7 |
| individual unit plastic area mm^2 | 0.4 | 0.5 | 0.5 | 1.3 | 1.3 | 1.3 | 1.3 | 1.3 | 1.3 | 1.3 | 1.3 | 1.3 |
| number of units | 1 | 1 | 1 | 1 | 2 | 3 | 4 | 6 | 7 | 8 | 9 | 10 |
| total units plastic area mm^2 | 0.4 | 0.5 | 0.5 | 1.3 | 2.6 | 4.0 | 5.3 | 7.9 | 9.2 | 10.6 | 11.9 | 13.2 |
| unit group diamater multiplier | 1 | 1 | 1 | 1 | 2 | 2.15 | 2.41 | 3 | 3 | 3.3 | 3.61 | 3.8 |
| unit group diameter mm | 1.0 | 1.1 | 1.2 | 1.7 | 3.4 | 3.7 | 4.1 | 5.1 | 5.1 | 5.6 | 6.1 | 6.5 |
| unit group area mm^2 | 0.8 | 1.0 | 1.1 | 2.3 | 9.1 | 10.5 | 13.2 | 20.4 | 20.4 | 24.9 | 29.6 | 33.1 |
| aramid and air thickness (mm) | 0.9 | 0.9 | 0.8 | 0.7 | 0.4 | 0.4 | 0.4 | 0.3 | 0.3 | 0.3 | 0.3 | 0.2 |
| Jacket ID (mm) | 2.8 | 2.8 | 2.8 | 3.1 | 4.3 | 4.5 | 4.9 | 5.7 | 5.7 | 6.2 | 6.7 | 7.0 |
| Jacket Wall mm | 0.5 | 0.6 | 0.6 | 0.8 | 0.9 | 1.0 | 1.1 | 1.1 | 1.4 | 1.4 | 1.4 | 1.4 |
| Jacket OD mm | 3.8 | 3.9 | 4.1 | 4.6 | 6.1 | 6.5 | 7.1 | 8.0 | 8.5 | 9.0 | 9.5 | 9.8 |
| Jacket area mm^2 | 5.3 | 5.9 | 6.9 | 9.2 | 14.4 | 17.5 | 21.5 | 24.6 | 31.2 | 33.3 | 35.4 | 36.8 |
| Unit Free Space width mm | 0.08 | 0.09 | 0.11 | 0.06 | 0.06 | 0.06 | 0.06 | 0.06 | 0.06 | 0.06 | 0.06 | 0.06 |
| % Free Space width | 13% | 14% | 14% | 6% | 6% | 6% | 6% | 6% | 6% | 6% | 6% | 6% |

| # fibers | 132 | 144 | 216 | 240 | 264 | 288 | 312 | 336 | 360 | 432 |
|---|---|---|---|---|---|---|---|---|---|---|
| Coating Area mm^2 | 4.9 | 5.3 | 8.0 | 8.8 | 9.7 | 10.6 | 11.5 | 12.4 | 13.3 | 15.9 |
| Reduced Coating Area mm^2 | 2.5 | 2.8 | 4.1 | 4.6 | 5.1 | 5.5 | 6.0 | 6.4 | 6.9 | 8.3 |
| Added FR Area | 2.3 | 2.5 | 3.8 | 4.2 | 4.7 | 5.1 | 5.5 | 5.9 | 6.4 | 7.6 |
| fibers per unit | 12 | 12 | 12 | 12 | 12 | 12 | 12 | 12 | 12 | 12 |
| fiber group diameter multiplier | 4.2 | 4.2 | 4.2 | 4.2 | 4.2 | 4.2 | 4.2 | 4.2 | 4.2 | 4.2 |
| fiber group diameter mm | 1.0 | 1.0 | 1.0 | 1.0 | 1.0 | 1.0 | 1.0 | 1.0 | 1.0 | 1.0 |
| fiber group diameter area mm^2 | 0.8 | 0.8 | 0.8 | 0.8 | 0.8 | 0.8 | 0.8 | 0.8 | 0.8 | 0.8 |
| unit plastic id mm | 1.1 | 1.1 | 1.1 | 1.1 | 1.1 | 1.1 | 1.1 | 1.1 | 1.1 | 1.1 |
| unit plastic od mm | 1.7 | 1.7 | 1.7 | 1.7 | 1.7 | 1.7 | 1.7 | 1.7 | 1.7 | 1.7 |
| individual unit plastic area mm^2 | 1.3 | 1.3 | 1.3 | 1.3 | 1.3 | 1.3 | 1.3 | 1.3 | 1.3 | 1.3 |
| number of units | 11 | 12 | 18 | 20 | 22 | 24 | 26 | 28 | 30 | 36 |
| total units plastic area mm^2 | 14.5 | 15.8 | 23.8 | 26.4 | 29.0 | 31.7 | 34.3 | 36.9 | 39.6 | 47.5 |
| unit group diamater multiplier | 4 | 4 | 5 | 5.5 | 5.6 | 6.02 | 6.5 | 7 | 7 | 7 |
| unit group diameter mm | 6.8 | 6.8 | 8.5 | 9.4 | 9.5 | 10.2 | 11.1 | 11.9 | 11.9 | 11.9 |
| unit group area mm^2 | 36.3 | 36.7 | 56.7 | 68.7 | 71.2 | 82.3 | 95.9 | 111.2 | 111.2 | 111.2 |
| aramid and air thickness (mm) | 0.2 | 0.2 | 0.2 | 0.2 | 0.2 | 0.2 | 0.2 | 0.2 | 0.2 | 0.1 |
| Jacket ID (mm) | 7.3 | 7.3 | 8.9 | 9.7 | 9.9 | 10.6 | 11.4 | 12.2 | 12.2 | 12.2 |
| Jacket Wall mm | 1.4 | 1.4 | 1.4 | 1.4 | 1.4 | 1.4 | 1.4 | 1.4 | 1.4 | 1.4 |
| Jacket OD mm | 10.1 | 10.1 | 11.7 | 12.5 | 12.7 | 13.4 | 14.2 | 15.0 | 15.0 | 15.0 |
| Jacket area mm^2 | 38.1 | 38.2 | 45.1 | 48.8 | 49.5 | 52.5 | 56.1 | 59.8 | 59.8 | 59.6 |
| Unit Free Space width mm | 0.06 | 0.06 | 0.06 | 0.06 | 0.06 | 0.06 | 0.06 | 0.06 | 0.06 | 0.06 |
| % Free Space width | 6% | 6% | 6% | 6% | 6% | 6% | 6% | 6% | 6% | 6% |

| Fiber Count | 4 | 5 | 6 | 12 | 24 | 36 | 48 | 72 | 84 | 96 | 108 |
|---|---|---|---|---|---|---|---|---|---|---|---|
| unit plastic id mm | 0.7 | 0.8 | 0.86 | 1.1 | 1.1 | 1.1 | 1.1 | 1.1 | 1.1 | 1.1 | 1.1 |
| unit plastic od mm | 1 | 1.1 | 1.16 | 1.7 | 1.7 | 1.7 | 1.7 | 1.7 | 1.7 | 1.7 | 1.7 |
| Cable OD | 3.8 | 3.9 | 4.1 | 4.6 | 6.1 | 6.5 | 7.1 | 8.0 | 8.5 | 9.0 | 9.5 |
| FR Plastic to coating ratio | 39 | 35 | 34 | 24 | 19 | 16 | 15 | 12 | 13 | 12 | 12 |
| FR Plastic/reduced coating | 75 | 68 | 65 | 47 | 38 | 32 | 30 | 25 | 26 | 25 | 24 |

| Fiber Count | 120 | 132 | 144 | 216 | 240 | 264 | 288 | 312 | 336 | 360 | 432 |
|---|---|---|---|---|---|---|---|---|---|---|---|
| unit plastic id mm | 1.1 | 1.1 | 1.1 | 1.1 | 1.1 | 1.1 | 1.1 | 1.1 | 1.1 | 1.1 | 1.1 |
| unit plastic od mm | 1.7 | 1.7 | 1.7 | 1.7 | 1.7 | 1.7 | 1.7 | 1.7 | 1.7 | 1.7 | 1.7 |
| Cable OD | 9.8 | 10.1 | 10.1 | 11.7 | 12.5 | 12.7 | 13.4 | 14.2 | 15.0 | 15.0 | 15.0 |
| FR Plastic to coating ratio | 11 | 11 | 10 | 9 | 9 | 8 | 8 | 8 | 8 | 7 | 7 |
| FR Plastic/reduced coating | 23 | 22 | 21 | 18 | 17 | 16 | 16 | 16 | 16 | 15 | 14 |

TABLE 10-continued

| | Estimated Prior Art | | | | | | | | | | | |
|---|---|---|---|---|---|---|---|---|---|---|---|---|
| MDP Cable OD (mm) | 3.8 | 3.9 | 4.1 | 4.5 | 5.7 | 6.2 | 6.7 | 7.5 | 7.5 | 7.9 | 8.3 | 8.6 |
| Prior Art Cable OD (mm) | 3.8 | 3.9 | 4.1 | 4.6 | 6.1 | 6.5 | 7.1 | 8.0 | 8.5 | 9.0 | 9.5 | 9.8 |
| MDP FR Plastic to coating ratio | 38.7 | 34.9 | 33.6 | 21.8 | 16.8 | 13.9 | 12.8 | 10.0 | 8.8 | 8.3 | 7.9 | 7.5 |
| Prior Art FR Plastic to coating ratio | 38.7 | 34.9 | 33.6 | 23.9 | 19.3 | 16.2 | 15.2 | 12.3 | 13.1 | 12.4 | 11.9 | 11.3 |
| MDP FR Plastic/reduced coating ratio | 75.3 | 68.0 | 65.5 | 42.8 | 33.2 | 27.6 | 25.6 | 20.2 | 17.8 | 16.9 | 16.1 | 15.3 |
| Prior Art FR Plastic/reduced coating ratio | 75.3 | 68.0 | 65.5 | 46.9 | 38.1 | 32.1 | 30.1 | 24.5 | 26.1 | 24.8 | 23.8 | 22.7 |
| Fiber Count | 4 | 5 | 6 | 12 | 24 | 36 | 48 | 72 | 84 | 96 | 108 | 120 |

| MDP Cable OD (mm) | 8.8 | 8.8 | 10.2 | 11.0 | 11.1 | 11.7 | 12.4 | 13.1 | 13.1 | 13.1 |
|---|---|---|---|---|---|---|---|---|---|---|
| Prior Art Cable OD (mm) | 10.1 | 10.1 | 11.7 | 12.5 | 12.7 | 13.4 | 14.2 | 15.0 | 15.0 | 15.0 |
| MDP FR Plastic to coating ratio | 7.1 | 6.7 | 5.5 | 5.4 | 5.1 | 5.0 | 5.0 | 4.9 | 4.7 | 4.1 |
| Prior Art FR Plastic to coating ratio | 10.8 | 10.2 | 8.7 | 8.5 | 8.1 | 7.9 | 7.9 | 7.8 | 7.5 | 6.7 |
| MDP FR Plastic/reduced coating ratio | 14.6 | 13.7 | 11.6 | 11.4 | 10.8 | 10.6 | 10.5 | 10.4 | 9.9 | 8.9 |
| Prior Art FR Plastic/reduced coating ratio | 21.7 | 20.5 | 17.6 | 17.3 | 16.5 | 16.2 | 16.1 | 16.0 | 15.3 | 13.9 |
| Fiber Count | 132 | 144 | 216 | 240 | 264 | 288 | 312 | 336 | 360 | 432 |

Figure 26:
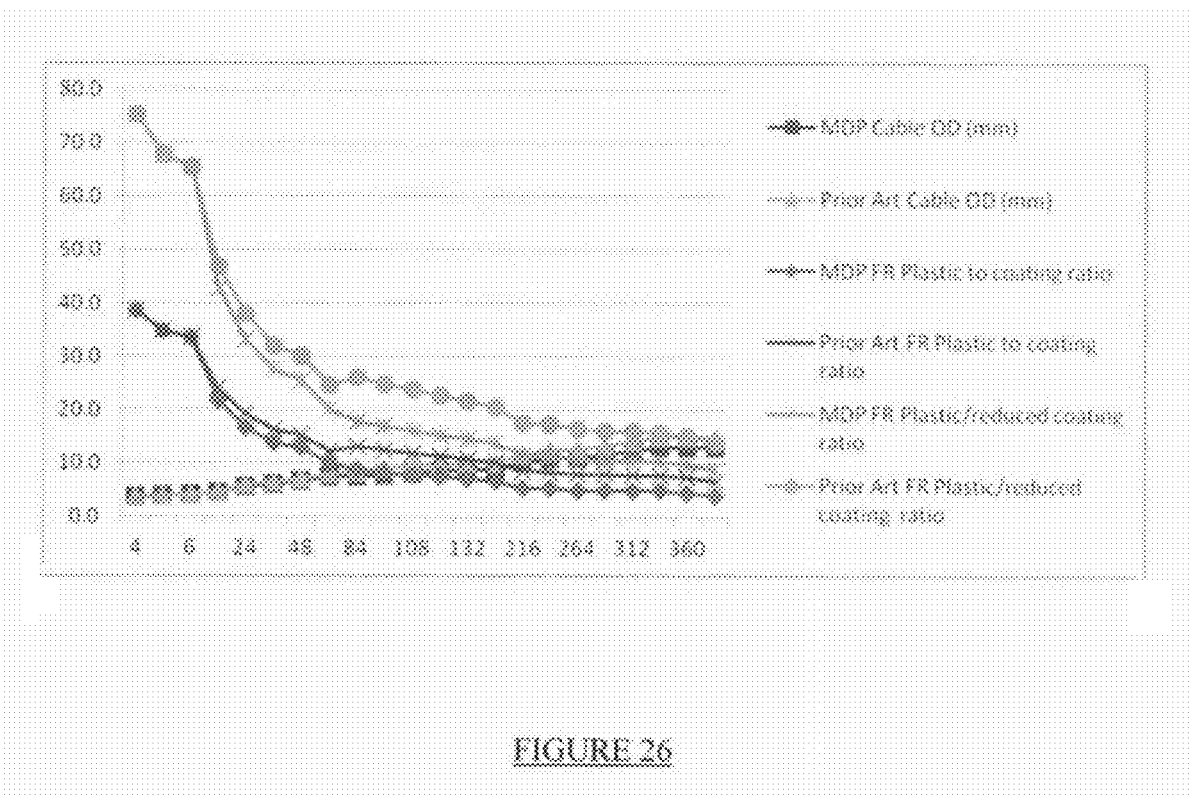
FIG. 26 is a chart showing the ratio of FR plastic to fiber coating for different fiber counts.

FIG. 26 shows that using, the present construction "MDP" (Micro Data Center Plenum) while keeping either same or smaller outside cable diameters, as the number of fibers per cable increase, the present cable 10 has a lower FR plastic/reduced coating ratio relative to the prior art. This reduced ratio gives more flexibility in the use of less construction materials, while simultaneously giving better smoke/fire response than prior art cables of the same size.

Thus, the prior art cables attempt to use thicker all PVC construction which barely passes the NFPA 260 UL 910 (fire/smoke) requirements. The present arrangement on the contrary achieves the burn requirements with sufficient margin to withstand the variability of follow-up confirmations or verifications testing. The present arrangement, moreover recognizes that at certain levels of plastic to UV (fiber) coating ratios that higher percentages of PVDF-FR must be used. The PVDF-FR is where smoke inhibitors and flame inhibitors are added to the PVDF much in the same way as with the PVC but the utilization of the PVDF renders a more effective resistance to the exposed flame of the NFPA 260 UL 910 tunnel test.

Furthermore, by utilizing the above described PVDF (modulus, etc. . . . ), it limits the polymer's negative effects on the fibers in contraction at cold temperatures. When making such cables 10 there is a need for balancing the tradeoffs between enough thickness for the burn and too much thickness for the cold temperature contraction. The present arrangement optimizes the material selection and thicknesses for the PVDF (portion of) the buffer tubes 16 and jacket 12 as described above, balancing the needs of the NFPA 260 UL 910 tunnel test and the cold temperature contraction exposure requirements.

In an alternative arrangement, it is noted that the above material with respect to the selection of FRPVC and PVDF on the tubes 16 specifically, as discussed above, the buffer tube wall thickness is one where the thickness is 0.15 mm (or 120% of glass diameter of 0.125 mm) to 0.195 mm (or 156% of glass diameter of 0.125 mm). This is in contrast to the standard loose tube thickness which is approximately 4 times (or 400% of the glass diameter of 0.125 mm) (e.g. the standard loose tube buffer tube wall thickness is 0.5 mm and the glass is 0.125 mm thus 0.5:0.125=4:1

However, this assumes a standard UV fiber 14 that is 0.125 mm, up to 0.250 mm with its UV coating. In the case where such typical fibers 14 are replaced with a 200 micron (0.200 mm) coated fiber 14, which use less UV coating, then the present arrangement contemplates further modification that allows for an even smaller cable yet, as laid out in the following table 12.

TABLE 12

| | MDP 4-432 Fiber OD (mm) 0.2 | | | | | | | | | | | |
|---|---|---|---|---|---|---|---|---|---|---|---|---|
| # fibers | 4 | 5 | 6 | 12 | 24 | 36 | 48 | 72 | 84 | 96 | 108 | 120 |
| .20 mm Coating Area mm^2 | 0.08 | 0.10 | 0.11 | 0.23 | 0.5 | 0.7 | 0.9 | 1.4 | 1.6 | 1.8 | 2.1 | 2.3 |
| fibers per unit | 4 | 5 | 6 | 12 | 12 | 12 | 12 | 12 | 12 | 12 | 12 | 12 |
| fiber group diameter multiplier | 2.4 | 2.7 | 30 | 4.2 | 4.2 | 4.2 | 4.2 | 4.2 | 4.2 | 4.2 | 4.2 | 4.2 |
| fiber group diameter mm | 0.5 | 0.5 | 0.6 | 0.8 | 0.8 | 0.8 | 0.8 | 0.8 | 0.8 | 0.8 | 0.8 | 0.8 |
| mm^2 | 0.2 | 0.2 | 0.3 | 0.5 | 0.5 | 0.5 | 0.5 | 0.5 | 0.5 | 0.5 | 0.5 | 0.5 |
| unit plastic id mm | 0.6 | 0.7 | 0.8 | 1.0 | 1.0 | 1.0 | 1.0 | 1.0 | 1.0 | 1.0 | 1.0 | 1.0 |
| unit plastic od mm | 0.9 | 1.0 | 1.1 | 1.3 | 1.3 | 1.3 | 1.3 | 1.3 | 1.3 | 1.3 | 1.3 | 1.3 |
| individual unit plastic area | 0.4 | 0.4 | 0.4 | 0.5 | 0.5 | 0.5 | 0.5 | 0.5 | 0.5 | 0.5 | 0.5 | 0.5 |
| number of units | 1 | 1 | 1 | 1 | 2 | 3 | 4 | 6 | 7 | 8 | 9 | 10 |
| total units plastic area mm^2 | 0.4 | 0.4 | 0.4 | 0.5 | 1.1 | 1.6 | 2.2 | 3.3 | 3.8 | 4.3 | 4.9 | 5.4 |
| unit group diameter multiplier | 1 | 1 | 1 | 1 | 2 | 2.15 | 2.41 | 3 | 3 | 3.3 | 3.61 | 3.8 |
| unit group diameter mm | 0.9 | 1.0 | 1.1 | 1.3 | 2.6 | 2.8 | 3.1 | 3.9 | 3.9 | 4.3 | 4.7 | 5.0 |
| unit group area mm^2 | 0.6 | 0.7 | 0.9 | 1.3 | 5.3 | 6.1 | 7.7 | 11.9 | 11.9 | 14.5 | 17.3 | 19.4 |
| aramid and air thickness (mm) | 0.9 | 0.9 | 0.9 | 0.8 | 0.5 | 0.5 | 0.5 | 0.4 | 0.4 | 0.4 | 0.3 | 0.3 |
| Jacket ID (mm) | 2.7 | 2.8 | 2.8 | 2.9 | 3.7 | 3.8 | 4.1 | 4.7 | 4.7 | 5.0 | 5.4 | 5.6 |
| Jacket Wall mm | 0.5 | 0.6 | 0.6 | 0.8 | 0.9 | 1.0 | 1.1 | 1.1 | 1.1 | 1.1 | 1.1 | 1.1 |
| Jacket OD mm | 3.8 | 3.9 | 4.1 | 4.4 | 5.4 | 5.8 | 6.4 | 7.0 | 7.0 | 7.3 | 7.7 | 7.9 |
| Jacket area mm^2 | 5.2 | 5.8 | 6.8 | 8.8 | 12.7 | 15.4 | 18.7 | 20.9 | 20.9 | 22.1 | 23.4 | 24.2 |

TABLE 12-continued

| MDP 4-432 Fiber OD (mm) 0.2 | | | | | | | | | | | |
|---|---|---|---|---|---|---|---|---|---|---|---|
| Unit Free Space width mm | 0.12 | 0.11 | 0.15 | 0.17 | 0.17 | 0.17 | 0.17 | 0.17 | 0.17 | 0.17 | 0.17 | 0.17 |
| % Free Space width | 24% | 20% | 25% | 20% | 20% | 20% | 20% | 20% | 20% | 20% | 20% | 20% |
| # fibers | | 132 | 144 | 216 | 240 | 264 | 288 | 312 | 336 | 360 | 432 |
| .20 mm Coating Area mm^2 | | 2.5 | 2.8 | 4.1 | 4.6 | 5.1 | 5.5 | 6.0 | 6.4 | 6.9 | 8.3 |
| fibers per unit | | 12 | 12 | 12 | 12 | 12 | 12 | 12 | 12 | 12 | 12 |
| fiber group diameter multiplier | | 4.2 | 4.2 | 4.2 | 4.2 | 4.2 | 4.2 | 4.2 | 4.2 | 4.2 | 4.2 |
| fiber group diameter mm | | 0.8 | 0.8 | 0.8 | 0.8 | 0.8 | 0.8 | 0.8 | 0.8 | 0.8 | 0.8 |
| mm^2 | | 0.5 | 0.5 | 0.5 | 0.5 | 0.5 | 0.5 | 0.5 | 0.5 | 0.5 | 0.5 |
| unit plastic id mm | | 1.0 | 1.0 | 1.0 | 1.0 | 1.0 | 1.0 | 1.0 | 1.0 | 1.0 | 1.0 |
| unit plastic od mm | | 1.3 | 1.3 | 1.3 | 1.3 | 1.3 | 1.3 | 1.3 | 1.3 | 1.3 | 1.3 |
| individual unit plastic area | | 0.5 | 0.5 | 0.5 | 0.5 | 0.5 | 0.5 | 0.5 | 0.5 | 0.5 | 0.5 |
| number of units | | 11 | 12 | 18 | 20 | 22 | 24 | 26 | 28 | 30 | 36 |
| total units plastic area mm^2 | | 6.0 | 6.5 | 9.8 | 10.8 | 11.9 | 13.0 | 14.1 | 15.2 | 16.3 | 19.5 |
| unit group diameter multiplier | | 4 | 4 | 5 | 5.5 | 5.6 | 6.02 | 6.5 | 7 | 7 | 7 |
| unit group diameter mm | | 5.2 | 5.2 | 6.5 | 7.2 | 7.3 | 7.8 | 8.5 | 9.1 | 9.1 | 9.1 |
| unit group area mm^2 | | 21.2 | 21.5 | 33.2 | 40.2 | 41.6 | 48.1 | 56.1 | 65.0 | 65.0 | 65.0 |
| aramid and air thickness (mm) | | 0.3 | 0.3 | 0.2 | 0.2 | 0.2 | 0.2 | 0.2 | 0.2 | 0.2 | 0.2 |
| Jacket ID (mm) | | 5.8 | 5.8 | 7.0 | 7.6 | 7.7 | 8.3 | 8.9 | 9.5 | 9.5 | 9.4 |
| Jacket Wall mm | | 1.1 | 1.1 | 1.1 | 1.1 | 1.1 | 1.1 | 1.1 | 1.1 | 1.1 | 1.1 |
| Jacket OD mm | | 8.1 | 8.1 | 9.3 | 9.9 | 10.0 | 10.5 | 11.2 | 11.8 | 11.8 | 11.7 |
| Jacket area mm^2 | | 25.0 | 25.1 | 29.2 | 31.5 | 31.9 | 33.8 | 36.0 | 38.3 | 38.3 | 38.0 |
| Unit Free Space width mm | | 0.17 | 0.17 | 0.17 | 0.17 | 0.17 | 0.17 | 0.17 | 0.17 | 0.17 | 0.17 |
| % Free Space width | | 20% | 20% | 20% | 20% | 20% | 20% | 20% | 20% | 20% | 20% |
| Fiber Count | 4 | 5 | 6 | 12 | 24 | 36 | 48 | 72 | 84 | 96 | 108 | 120 |
| unit plastic id mm | 0.6 | 0.65 | 0.75 | 1 | 1 | 1 | 1 | 1 | 1 | 1 | 1 | 1 |
| unit plastic od mm | 0.9 | 0.95 | 1.05 | 1.3 | 1.3 | 1.3 | 1.3 | 1.3 | 1.3 | 1.3 | 1.3 | 1.3 |
| Cable OD | 3.8 | 3.9 | 4.1 | 4.4 | 5.4 | 5.8 | 6.4 | 7.0 | 7.0 | 7.3 | 7.7 | 7.9 |
| FR Plastic to coating ratio | 72 | 65 | 63 | 41 | 30 | 25 | 23 | 18 | 15 | 14 | 14 | 13 |
| Fiber Count | | 132 | 144 | 216 | 240 | 264 | 288 | 312 | 336 | 360 | 432 |
| unit plastic id mm | | 1 | 1 | 1 | 1 | 1 | 1 | 1 | 1 | 1 | 1 |
| unit plastic od mm | | 1.3 | 1.3 | 1.3 | 1.3 | 1.3 | 1.3 | 1.3 | 1.3 | 1.3 | 1.3 |
| Cable OD | | 8.1 | 8.1 | 9.3 | 9.9 | 10.0 | 10.5 | 11.2 | 11.8 | 11.8 | 11.7 |
| FR Plastic to coating ratio | | 12 | 11 | 9 | 9 | 9 | 8 | 8 | 8 | 8 | 7 |

For example the above arrangement may employ a basic optical fiber (0.125 mm) which replaces some or all of the UV coating with a mini-tight buffer of FRPVC or PVDF. For example, PVDF consumption may be further reduced by utilizing a 0.125 mm glass and a 0.2 mm coating diameter fiber where the remaining diameter of 0.2 mm to 0.25 mm is comprised of FRPVC thus reducing the coating area by $1-(0.2^2-0.125^2))/(0.25^2-0.125^2) = 1-(0.024375)/0.046875) = 1-0.52$ or 48%.
This reduces the fuel and shifts the ranges where PVDF must be used thereby increasing the opportunity to use an all FRPVC construction of a cable diameter up to 19 mm.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An optical fiber cable comprising:
    a plurality of fiber optic elements, said fiber optic elements including a glass portion and a UV optical coating portion;
    a plurality of buffer tubes, each having a defined wall thickness and containing one or more of said plurality of optical fibers, said buffer tube being made of a fire retardant polymer; and
    a jacket, having a defined wall thickness, surrounding said buffer tubes, said jacket being made of a fire retardant polymer,
    wherein said fire retardant polymers for said plurality of buffer tubes and for said jacket are selected from a defined ratio of PVDF (PolyVinyliDene Fluoride) and FRPVC (Fire Resistance Poly Vinyl Chloride) and
    wherein said defined wall thickness of said buffer tubes, said defined wall thickness of said jacket and said defined ratio of PVDF to FRPVC, and wherein a ratio of total polymer to UV optical coating of said fiber optic elements, by area, is substantially in the range of 5:1 to 9:1 such that said cable meets the NFPA 262 Plenum (UL 910 Test) fire/smoke test standards.

2. The optical fiber cable as claimed in claim 1, wherein said ratio of total polymer to UV optical coating of said fiber optic elements, by area, is substantially 7:1.

3. The optical fiber cable as claimed in claim 1, wherein said buffer tubes each have a wall thickness in the range of 0.15 m-0.22 mm.

4. The optical fiber cable as claimed in claim 3, wherein said buffer tubes each have a wall thickness of 0.15 mm.

5. The optical fiber cable as claimed in claim 4, wherein said fiber optic elements exhibit an attenuation of 0.07 -0.4 db/km at -60° C.

6. The optical fiber cable as claimed in claim 4, wherein said fiber optic elements exhibit an attenuation of 0.20-0.82 db/km at -60° C.

7. The optical fiber cable as claimed in claim 3, wherein said buffer tubes each have a wall thickness of 0.195 mm.

8. The optical fiber cable as claimed in claim 1, wherein an excess fiber length of said optical fiber elements relative to said buffer tubes is kept at tolerance of +/-0.0005.

9. The optical fiber cable as claimed in claim 1, wherein an inside diameter of said buffer tubes of said optical fiber cable result in cross sectional area that is substantially 12%-16% larger than said cross sectional area of said fiber optic elements therein.

10. The optical fiber cable as claimed in claim 1, wherein an inside diameter of said buffer tubes of said optical fiber cable result in cross sectional area that is substantially 14% larger than said cross sectional area of said fiber optic elements therein.

11. The optical fiber cable as claimed in claim 1, wherein said FRPVC has a Young's Modulus peak of 20,000 with a range of 19,000-21,000 psi, a Young's Modulus slope average of 13,000 with a range of 12,000 to 14,000 psi, between the 0.05% to 0.35% strain range, a tensile strength of 1500-2500 psi at 250-350% elongation, and a hardness shore C 70-90.

12. The optical fiber cable as claimed in claim 1, wherein said and/or a PVDF having a Oxygen index of 57,300% tensile strength of 1600 psi, a Young's Modulus at 0.3% strain of 42,000 psi, a peak Young's Modulus of 60,000 psi at 0.05% strain, at 5% strain a Young's Modulus of 20,000 psi, and hardness 47 D.

13. An optical fiber cable comprising:
a plurality of fiber optic elements, said fiber optic elements including a glass portion of substantially 0.125 mm in diameter and a UV optical coating portion of substantially 0.0375 mm in thickness such that said fiber optical elements are substantially 0,200 mm in diameter;
a plurality of buffer tubes, each having a defined wall thickness and containing one or more of said plurality of optical fibers, said buffer tube being made of a fire retardant polymer; and
a jacket, having a defined wail thickness, surrounding said buffer tubes, said jacket being made of a fire retardant polymer,
wherein said fire retardant polymers for said plurality of buffer tubes and for said jacket are selected from a defined ratio of PVDF (PolyVinyliDene Fluoride) and FRPVC (Fire Resistance Poly Vinyl Chloride) and
wherein said defined wall thickness of said buffer tubes, said defined wall thickness of said jacket and said defined ratio of PVDF to FRPVC, and wherein a ratio of total polymer to UV optical coating of said fiber optic elements, by area, is substantially in the range of 10:1 to 18:1 such that said cable meets the NFPA 262 Plenum (UL 910 Test) fire/smoke test standards.

14. The optical fiber cable as claimed in claim 13 wherein said fiber optic elements each have an additional layer of FR polymer over said UV coating of substantially 0.025 mm thickness such that said fiber optical elements are substantially 0.250 mm in diameter.

* * * * *

UNITED STATES PATENT AND TRADEMARK OFFICE
CERTIFICATE OF CORRECTION

| | |
|---|---|
| PATENT NO. | : 8,855,455 B2 |
| APPLICATION NO. | : 13/303350 |
| DATED | : October 7, 2014 |
| INVENTOR(S) | : Keller et al. |

It is certified that error appears in the above-identified patent and that said Letters Patent is hereby corrected as shown below:

In the Claims,

Column 22, Claim 13, Line 2: The number "0,200mm" between the words "substantially" and "in" should read as "0.200mm"

Column 22, Claim 13, Line 7: The word "wail" between the words "defined" and "thickness" should read as "wall"

Signed and Sealed this
Sixth Day of January, 2015

Michelle K. Lee
*Deputy Director of the United States Patent and Trademark Office*